United States Patent
Mancusi et al.

(10) Patent No.: US 6,418,481 B1
(45) Date of Patent: Jul. 9, 2002

(54) RECONFIGURABLE MATRIX SWITCH FOR MANAGING THE PHYSICAL LAYER OF LOCAL AREA NETWORK

(75) Inventors: Michael D. Mancusi, Holliston; Joseph E. Massery, Westborough; Roger F. Osmond, Littleton; Michael J. Fitzgerald, Framingham, all of MA (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/632,284

(22) Filed: Aug. 3, 2000

Related U.S. Application Data

(63) Continuation of application No. 08/294,882, filed on Aug. 23, 1994, now Pat. No. 6,275,864, which is a continuation of application No. 07/829,119, filed on Jan. 31, 1992, now abandoned, which is a continuation-in-part of application No. 07/744,295, filed on Aug. 13, 1991, now abandoned.

(51) Int. Cl.[7] .................. G06F 15/16; G06F 15/177; G06F 15/173
(52) U.S. Cl. .................. 709/250; 709/220; 709/224
(58) Field of Search .................. 709/250, 224, 709/223, 225, 220; 340/870.36; 326/38; 710/1, 100, 129, 131

(56) References Cited

U.S. PATENT DOCUMENTS

| | | |
|---|---|---|
| 4,032,893 A | 6/1977 | Moran |
| 4,255,741 A | 3/1981 | Peterson |
| 4,393,497 A | 7/1983 | Cantwell, Jr. |
| 4,633,245 A | 12/1986 | Blount et al. |
| 4,674,085 A | 6/1987 | Aranguren et al. |
| 4,772,811 A * | 9/1988 | Fujioka et al. ............... 370/465 |
| 4,845,706 A | 7/1989 | Franaszek |
| 4,872,197 A | 10/1989 | Pemmaraju |
| 4,899,333 A | 2/1990 | Roediger |
| 4,933,936 A | 6/1990 | Rasmussen et al. |
| 5,048,014 A | 9/1991 | Fischer |
| 5,138,615 A | 8/1992 | Lamport et al. |
| 5,140,585 A | 8/1992 | Tomikawa |
| 5,214,646 A | 5/1993 | Yacoby |
| 5,224,108 A * | 6/1993 | McDysan et al. ......... 370/110.1 |
| 5,226,039 A | 7/1993 | Frank et al. |
| 5,274,637 A | 12/1993 | Sakamura et al. |
| 5,301,303 A | 4/1994 | Abraham et al. |

\* cited by examiner

*Primary Examiner*—Zarni Maung
(74) *Attorney, Agent, or Firm*—Brooks & Kushman P.C.

(57) ABSTRACT

A wiring hub for interconnecting a plurality of network components to form a local area network, the wiring hub including a data signal bus and a programmable switching mechanism connected to the data signal bus. The switching mechanism includes a plurality of ports each of which can be electrically coupled to a different one of the plurality of network components so as to pass communications signals to and receive communications signals from the network component to which it is coupled. The programmable switching mechanism interconnects a selectable set of the plurality of ports together through the data signal bus and in any user selectable ordered sequence.

2 Claims, 16 Drawing Sheets

RECONFIGURABLE MATRIX SWITCH FOR MANAGING THE PHYSICAL LAYER OF LOCAL AREA NETWORK

CROSS-REFERENCE TO RELATED APPLICATIONS

This is a continuation of U.S. patent application Ser. No. 08/294,882, filed Aug. 23, 1994 now U.S. Pat. No. 6,275, 864, which is a continuation of U.S. patent application Ser. No. 07/829,119, filed Jan. 31, 1992 now abandoned, which is a continuation-in-part of U.S. patent application Ser. No. 07/744,295 entitled "Network Management System for a Freely Configurable Network", filed on Aug. 13. 1991 now abandoned, the disclosures of which are hereby expressly incorporated by reference in their entire.

BACKGROUND OF THE INVENTION

The invention relates to an apparatus for managing a local area network, in particular, it relates to a switching mechanism that is used to manage the physical layer of a local area network.

Local area networks (LANs) provide a popular, cost effective way of interconnecting many computing resources (e.g. personal computers, minicomputers or workstations) within an enterprise. The backbone of the LAN is a wiring system that provides a physical transmission medium for interconnecting the computing resources. The wiring system may be coaxial cable, shielded or unshielded copper wire, or fiber optic cable. For each computing resource there is a transceiver that provides the electrical connection or interface between the computing resource and the wiring system. The transceiver converts the information from the computing resource into the actual signals that propagate over the wiring system. The LAN also includes network software which assembles the messages into the format required by the particular protocol used for communication over the network.

A common LAN configuration is the ring network. It is so named because the computing resources or stations are connected together through a series of point-to-point cables to form a ring. Such ring networks are thus inherently ordered, each station having an upstream neighbor from which it receives information and a downstream neighbor to which it transfers information. In one of the oldest and most commonly used ring networks, a bit pattern, referred to as a token, circulates around the ring from one station to the next. When a station has something to send to another station, it captures the token and gains the right to transmit information over the network. When its transmission is complete, it releases the token so that some other station can gain the right to transmit over the network.

Typically, the actual physical interconnections in the ring network occur at one or more central locations referred to as wiring closets. For each station in the ring, cables are run into the wiring closet that carry communications to and from that station. In such systems, when reconfiguring the ring becomes necessary for any reason (e.g. for maintenance and repair or changing needs of the network users), it is necessary to go into the wiring closets and manually rewire the interconnections. This, of course, can be a time consuming and difficult job. In addition, physically disturbing the cables and the interconnections increases the risk that network failures will occur.

SUMMARY OF THE INVENTION

In general, in one aspect, the invention features a wiring hub for interconnecting a plurality of network components to form a local area network. The wiring hub includes a data signal bus and a programmable switching mechanism connected to the data signal bus. The switching mechanism includes a plurality of ports each of which can be electrically coupled to a different one of the plurality of network components so as to pass communications signals to and receive communications signals from the network component to which it is coupled. The programmable switching mechanism interconnects a selectable set of the plurality of ports together through the data signal bus and in any user selectable ordered sequence.

Preferred embodiments include the following features. The wiring hub also includes a passive backplane that contains the data signal bus and a plurality of connectors connecting to the data signal bus. The switching mechanism includes a plurality of port module cards each of which is plugged into a different one of the plurality of connectors on the backplane. Each of the port module cards includes a different subset of the plurality of ports. The bus includes a plurality of signal lines and each of the port module cards includes a plurality of multiplexers equal in number to the number of ports on that card. Each of the multiplexers on a port module card is associated with a different one of the ports on that card and is able to electrically couple a signal from any one of the plurality of signal lines of the bus to the port with which that multiplexer is associated. The port module cards each include a plurality of driver modules equal in number to the number of ports on that card and each of which is associated with a different one of the ports on that card. Each driver module is assigned to drive a different one of the plurality of signal lines on the bus. Each driver module includes a left driver and a right driver. The left driver drives one side of its assigned signal line and the right driver drives the right side of its assigned signal line.

Preferred embodiments also include the following additional features. The wiring hub also includes a controller card that generates control signals that control the operation of the programmable switching mechanism. The backplane includes a control bus to which the control card and the port module cards are electrically coupled. The control bus carries the control signals to the port module cards so as to control the multiplexers on them. The wiring hub includes two power supply cards connected to the power bus and the backplane includes a power bus to which the power suplies are connected. Power is supplied over the power bus to the control card and the plurality of port module cards, which are also electrically connected to the power bus.

Also in preferred embodiments, the data signal bus includes a plurality of signal lines, and the programmable switching mechanism includes a full, non-blocking matrix switch having a plurality of input terminals equal in number to the plurality of signal lines and a plurality of output terminals equal in number to the plurality of ports. Each of the input terminals receives a signal from a different one of the plurality of signal lines and each of the output terminals provides a signal to a different one of the plurality of ports. The matrix switch is able to electrically couple the signal from any one of the input terminals to any one of the output terminals. The programmable switching mechanism also includes a set of configuration registers. The matrix switch is configured by writing configuration information to that set of registers. The configuration information identifies which input terminals are to be electrically coupled to which output terminals. The controller module controls the matrix switch by writing control information to the set of configuration registers. The wiring hub further includes means for determining the state of each of the plurality of ports and means for recording the state of the plurality of ports. The controller module includes means for reading the state recording means and means for reconfiguring the matrix switch in response to detecting a change in state.

One advantage of the invention is that it enables the network manager to easily control and modify the configuration of a local area network from a central location and without having to physically rearrange wiring and cables in wiring closets. The rearrangement of connections is done automatically by a switching mechanism under software control. Also, the invention enables the network manager to connect the stations in any order and in any of a number of different local area networks.

Furthermore, use of a passive backplane yields additional significant advantages in terms of system reliability and ease of maintenance. Since active components are more often the cause of system failures, keeping active components off of the backplane greatly reduces the likelihood of having to repair the backplane. If all of the active components are only on the cards which plug into the backplane (i.e., the port cards, the RI/RO cards, the controller and the power supplies), then a failure of one of the active components can be fixed by merely replacing the card. In general, repairs to backplanes typically remove the system from service for a significant period of time. The use of the passive backplane greatly reduces the likelihood that repairs will ever have to be done to the backplane.

Other advantages and features will become apparent from the following description of the preferred embodiment and from the claims.

DESCRIPTION OF THE PREFERRED EMBODIMENT

Structure and Operation

I. Overview

Figure 1:
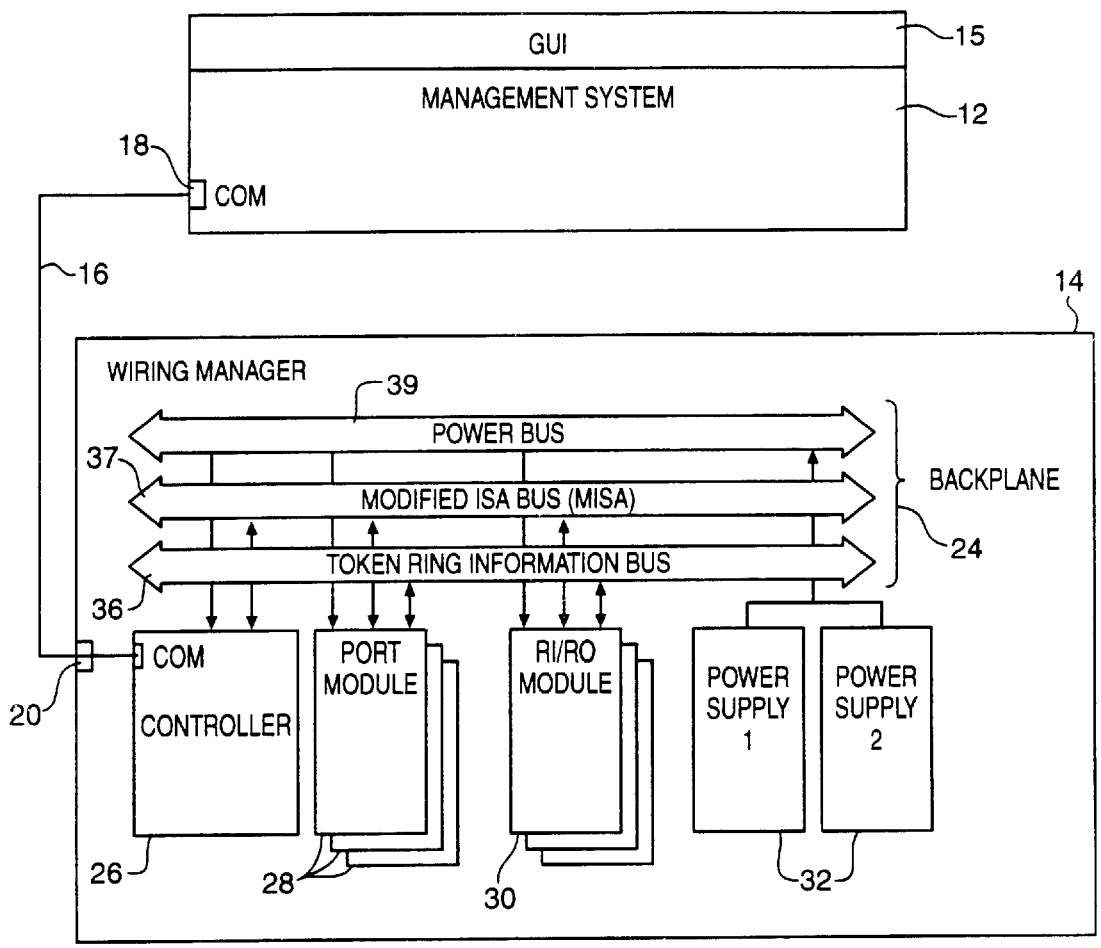
FIG. 1 is a block diagram of a system for configuring and managing a Local Area Network (LAN)

Referring to FIG. 1, a system for configuring and managing a Local Area Network (LAN) includes two components, namely, a LAN management system (LMS) 12 and a wiring manager 14. LMS 12 handles the higher level management functions of the system and it provides a graphical user interface (GUI) 15 based on X Windows™ and Motif™, which displays connection and network status information to the user and enables the user to communicate commands to LMS 12 and wiring manager 14. Additional details regarding LMS 12 may be found in U.S. Appl. Ser. No. 07/744,295, filed on Aug. 13, 1991 now abandoned, and incorporated herein by reference.

LMS 12 and wiring manager 14 communicate with each other over a dedicated line 16 using an asynchronous serial communications protocol. LMS 12 and wiring manager 14 each have a communication port 18 and 20, respectively, which supports the communication. LMS 12, which can manage more than one wiring manager, communicates with its controlled wiring managers over a serial control channel. This control channel comprises a loop or chain of wiring managers connected via RS-422 links (not shown), and an RS-232 connection between LMS 12 and one or two wiring managers.

II. Wiring Manaaer

Wiring manager 14 handles switching functions, connection related operations, network interface and immediate fault response duties. Wiring manager 14 can establish or break networks, merge or split networks, configure network nodes (stations) into any number of logical networks (up to the maximum number of ports in the wiring manager), and add or remove nodes from networks. In addition, wiring manager 14 can respond to changes in port status (e.g. Token Ring port phantom DC on/off in real time), without first consulting with LMS 12, by either connecting the port to or removing it from its defined subnet.

The inter-wiring manager connections operate at a fixed industry standard rate of 19,200 bps. The RS-232 connection between the management system and a wiring manager is capable of supporting other transmission speeds.

Wiring manager 14 includes a passive backplane 24 to which can be connected a controller card 26, a maximum of twelve station port module cards 28, four ring-in/ring-out (RI/RO) module cards 30, and two power supplies 32. Each station port module card 28 includes twelve ports to which port stations may be connected. Each RI/RO module card 30 includes two input and output ports which enables one to merge two other rings with a third ring. Backplane 24 supports all control signals, port data signals, and power required for these wiring manager components. For reliability and ease of maintenance reasons, all components resident on backplane 24 are passive. There are no active components on backplane 24.

Wiring manager 14 supports a maximum of 152 data ports. These ports connect to the client's network equipment. In the case of Token Ring networks, wiring manager 14 provides the trunk coupling functions of a standard Multistation Access Unit (MAU).

The two power supply modules 32 are responsible for providing all regulated power and power status signals to the other wiring manager components. Dual detachable power cords, one per power unit, connect wiring manager 14 to the line power outlet or power distribution unit. Each power supply module 32 is capable of supplying the maximum power required by a fully populated wiring manager, allowing a failed supply to be removed from the system without adversely affecting system operation. The power supplies support load sharing, allowing one supply to detect the failure of the other and assume responsibility for the full power load. Switch-over following supply failure or removal is transparent to all system components and does not affect network traffic or controller operation.

Station port module cards 28 facilitate connection of wiring manager 14 to the user's local area network stations (not shown). These cards also implement the switching function used by wiring manager software to configure ports into logical networks. The switching function is that of a full, non-blocking matrix switch. Any port can be "connected" to any other port via software programming, allowing users to configure their connected stations into logic token rings.

The described embodiment accepts the following station port module cards:

4/16 Mb STP Station Port Module (RJ-45)
4/16 Mb UTP Station Port Module (RJ-45)

where STP and UTP stand for Shielded Twisted Pair and Unshielded Twisted Pair, respectively.

Station port module cards supporting connection to UTP cable contain internal media filters on each port allowing direct connection to the UTP cable. User stations are required to support internal UTP media filters or external media filters for use with the UTP cable.

RI/RO port module cards 30 facilitate connection of a wiring manager to another wiring manager or to any IBM 8228 compatible MAU. They enable the user to extend logical networks beyond a single wiring manager. RI/RO port module cards 30 also implement the switching function that is used by station port module cards 28 for connection to any other port.

The following RI/RO port module cards are supported in the described embodiment:

4/16 Mb STP RI/RO Port Module
4/16 Mb Fiber-Optic RI/RO Port Module

A. Switching Mechanism

Figure 2:
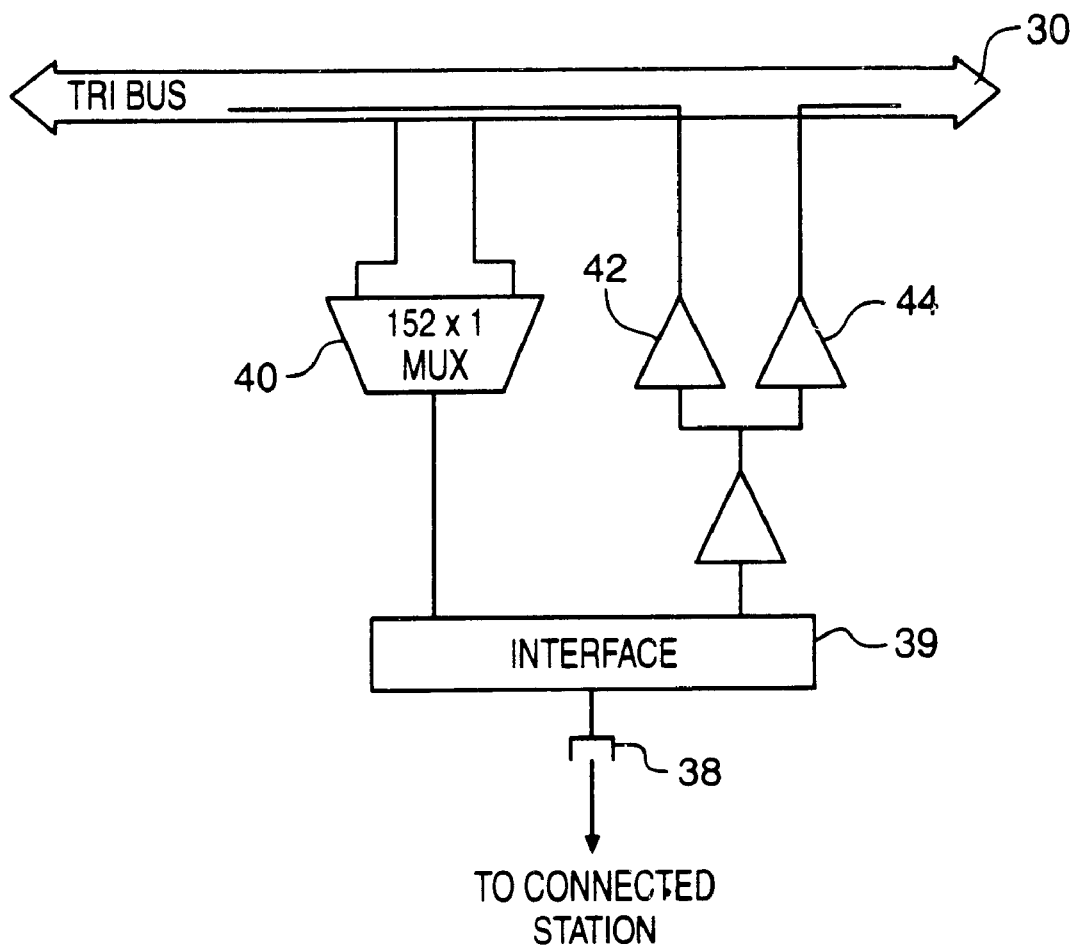
FIG. 2 is a high level functional representation of the switching mechanism.

FIG. 2 is a high level functional representation of the switching mechanism implemented by port module card 28 and RI/RO module card 30 within wiring manager 14. Backplane 24 includes a Token Ring Information (TRI) Bus 36 including 152 pairs of signal lines, one pair for each of the 152 ports 38 (only one of which is shown) supported by wiring manager 14. Each port 38 transmits the selected data to and receives data from its connected station through an interface 39. Every port 38 on a station port module card 28 is able to select its LAN output (to station) data from any other port in the system. To implement this functionality, for each port 38 on station port module card 28 there is a 152×1 switching mechanism 40. The 152×1 switching mechanism 40 selects the particular one of the 152 lines of TRI bus 36 that will supply the input signal to that port. The input from port 38 is, in turn, connected to a unique one of the 152 pairs of bus lines through two drivers, namely a right driver 42 connected to one of the lines of the pair and a left driver 44 connected to the other line of the pair. Each of the 152 pairs of token ring signal lines in TRI bus 36 of backplane 24 carries the signals from a predetermined one of the 152 ports that are supported in wiring manager 14.

Port module card 28 does not drive the entire bus line to which a particular port 38 is assigned. Rather, controller module 26 instructs port module card 28 to drive either the right or left portion of the appropriate bus pair depending upon where the downstream neighbor (i.e., the neighbor to which the station transfers its data in the hierarchically ordered Token Ring) is located. Driving only one line of the TRI bus pairs in a single-ended fashion, rather than the entire line in a party-line fashion, reduces the amount of power which must be supplied to the line through drivers 42 and 44 and greatly improves the signal quality on the line.

Figure 3:
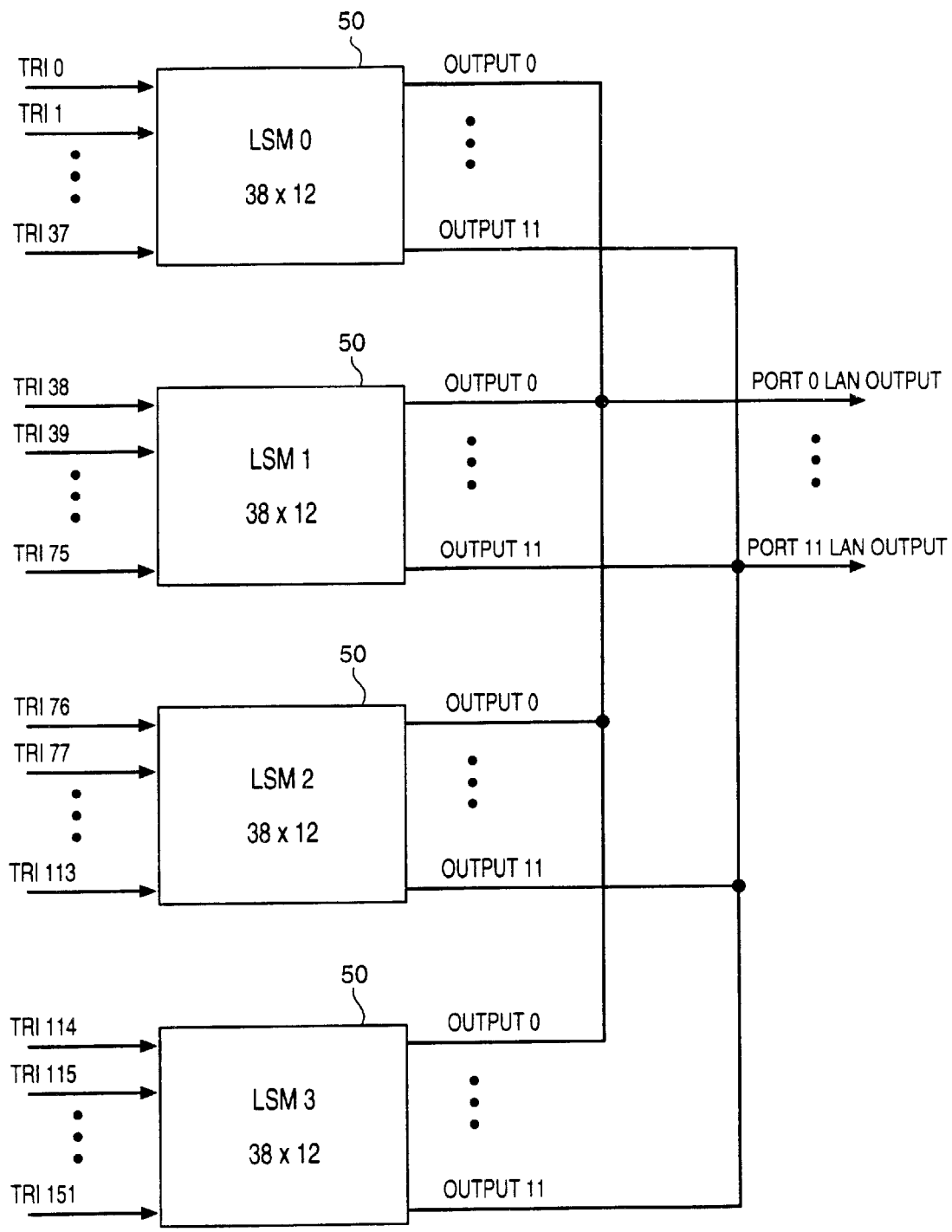
FIG. 3 shows an implementation of the switching mechanism using four LAN Switching Mechanism (LSM) chips.

Referring to FIG. 3, the twelve 152×1 switching mechanisms for the twelve ports on a station port module card, are implemented by four LAN Switching Mechanism (LSM) chips 50, also labelled in LSM 0 through LSM 3. Network data is transmitted through wiring manager backplane 24 on TRI bus 36 and is distributed to the four LSM chips 50. Each LSM chip 50 receives Token Ring input data signals from a different group of 38 signal lines of the 152 line TRI bus 36 (with lines labelled TRI 0 through TRI 151). In the described embodiment, LSM 0 is connected to TRI 0 through TRI 37; LSM 1 is connected to TRI 38 through TRI 75; LSM 2 is connected to TRI 76 through TRI 113; and LSM 3 is connected to TRI 114 through TRI 151. Each LSM chip 50 also includes twelve output lines, each one directed to a different one of the twelve ports that are supported by station port module card 28. Each of the 12 ports drives its output data to the port module's external LAN interface circuitry (not shown).

Figure 4:
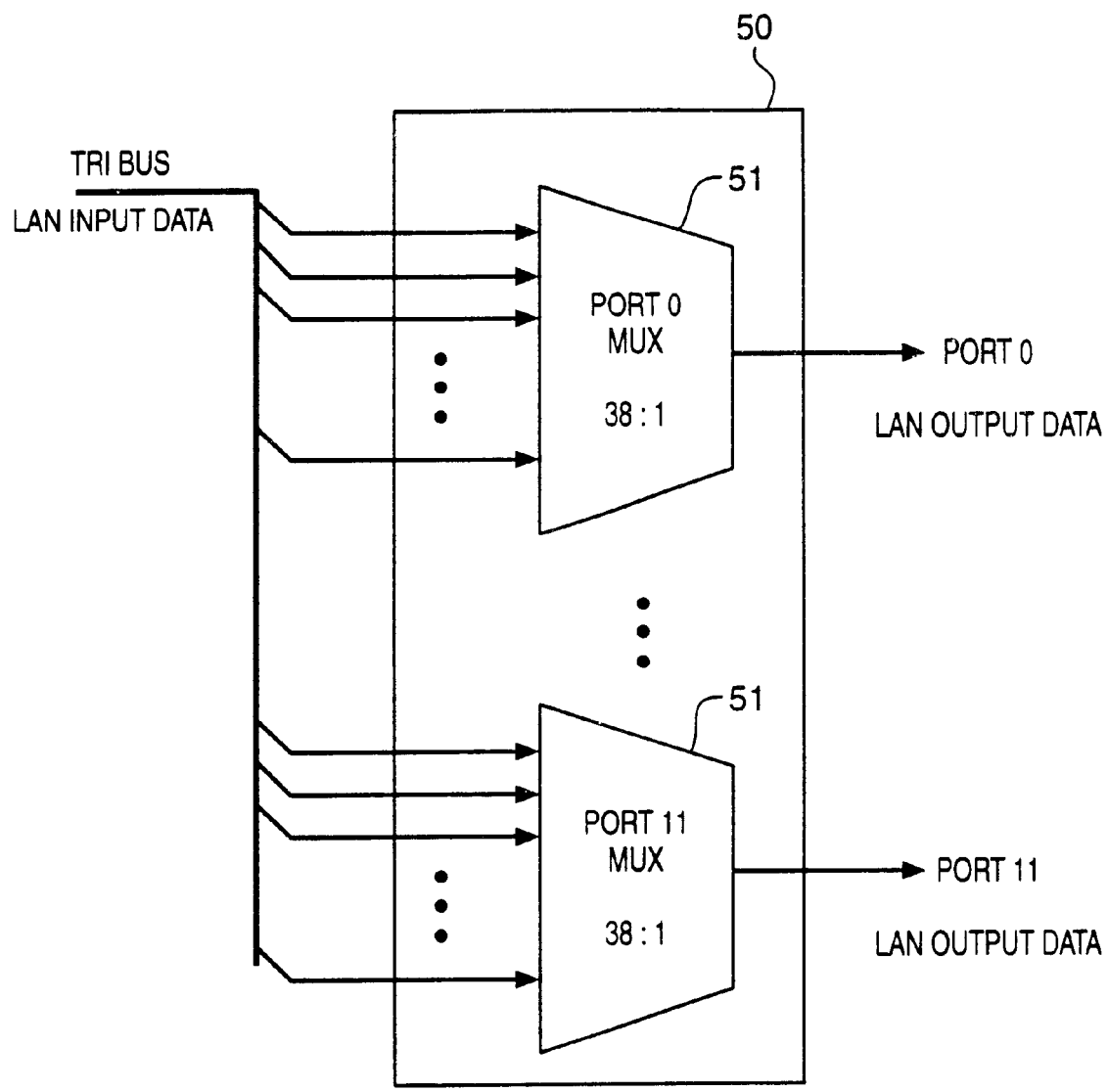
FIG. 4 is a block diagram of the switching mechanism within a single LSM chip.

As shown in FIG. 4, each of the LSM chips 50 contains twelve 38-by-1 multiplexers 51, each of which is capable of electrically coupling any one of the 38 input lines to any one of the twelve output lines. In the case of a Token Ring LAN network, however, software prevents more than one input line from being coupled to the same output line at the same time.

LSM chips 50 are ASIC's (Application Specific Integrated Circuit) manufactured by using 1.5$\mu$m gate array technology and a commercially available gate array library.

Figure 5:
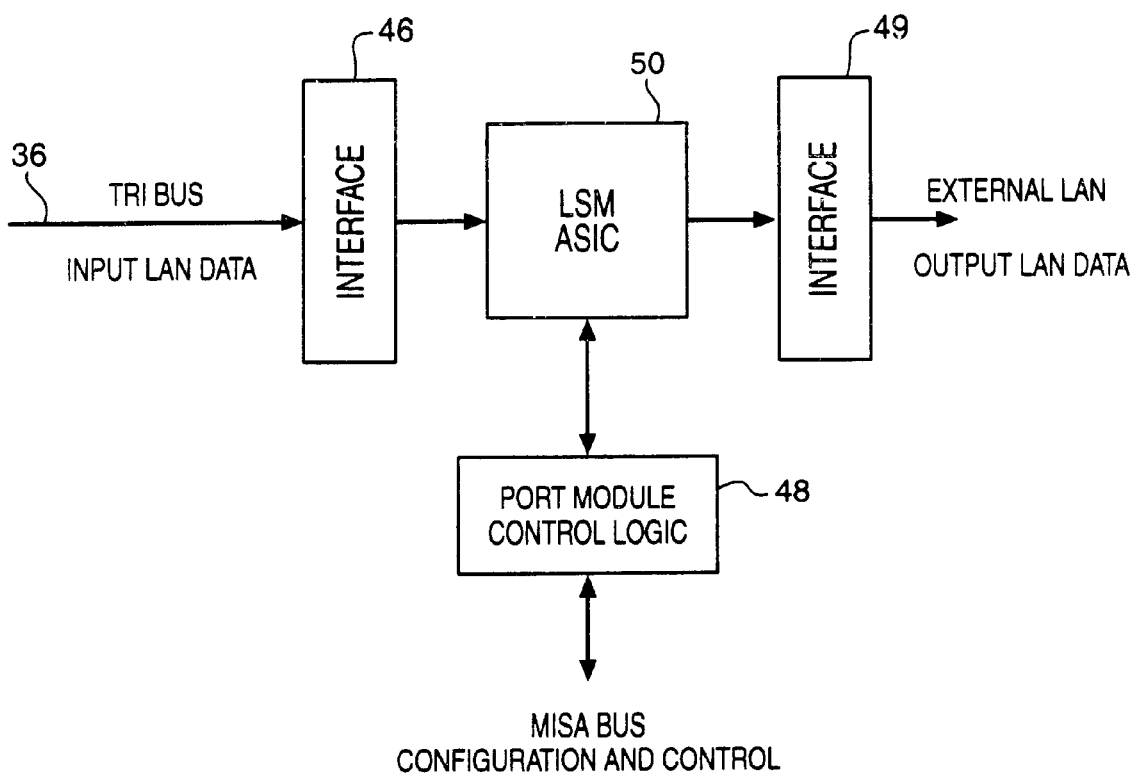
FIG. 5 is a block diagram showing the three signal interfaces for each LSM chip.

Referring to FIG. 5, each LSM chip 50 has three signal interfaces. There is an input signal interface 46 through which LAN input data is provided by TRI Bus 36. There is a port module control logic interface 48 containing on-card control logic and through which control and configuration information is received from controller module 26 via MISA bus 37. And there is an output signal interface 49 through which the LAN output signals from the LSM chip are sent to the port module's External LAN Interface.

Figure 6:
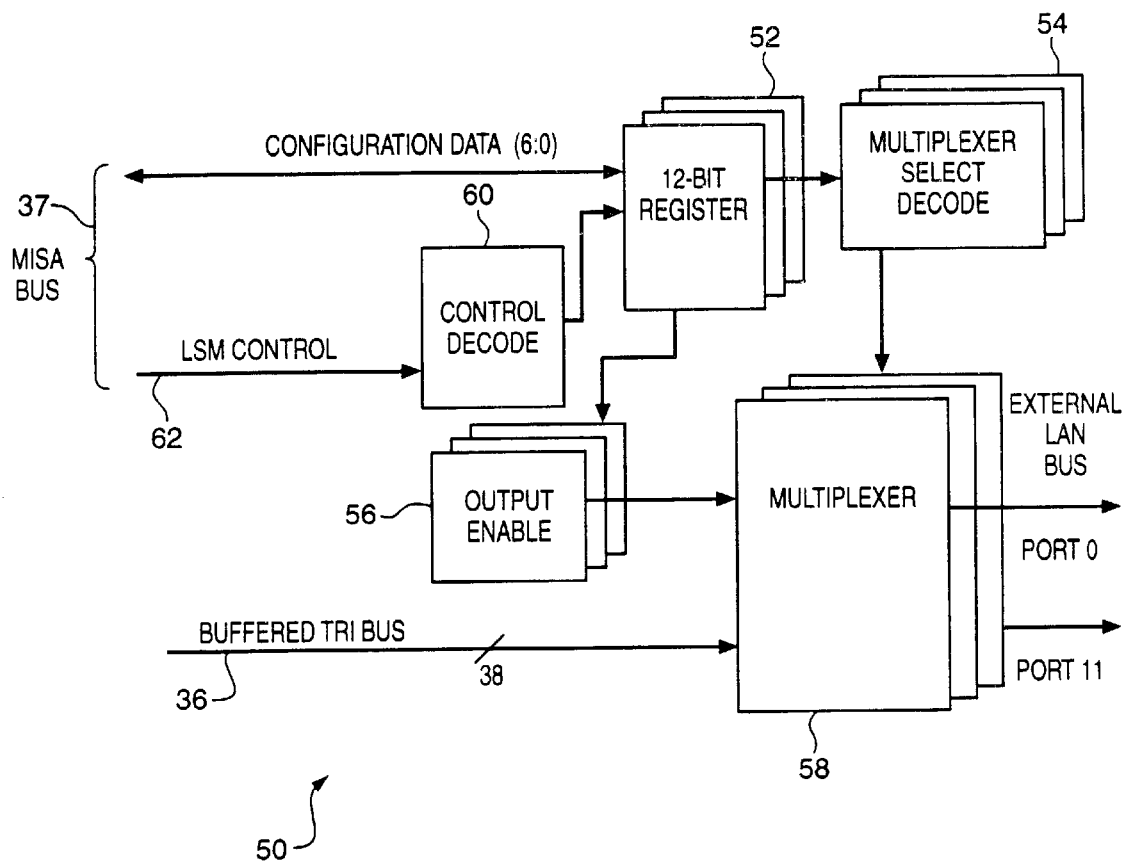
FIG. 6 is a functional block diagram of a LSM chip.

Referring to FIG. 6, the functional structure of each LSM chip 50 is twelve parallel pathways, each performing a 38-to-1 multiplex operation. Each pathway contains the following four functional blocks: a 12-bit configuration register 52; a multiplexer select decode block 54; an output enable block 56; and a multiplexer block 58 (which includes the twelve 38:1 multiplexers described above). In addition, there is a control decode block 60 that is common to all twelve pathways. Each of these components will now be described in greater detail.

Multiplexer block 58 includes the twelve 38:1 multiplexers 51, one for each output path/port. Each multiplexer in multiplexer block 58 selects one of 38 input lines to transmit out of a port. The inputs are designated as TRI bus network information signals which are external LSM inputs. The multiplexer select signals are received from multiplexer select decode block 54.

Control decode block 60 performs all configuration and control of all registers within the LSM chip. It includes 12 output paths, one for each of the ports on the station port module card. It receives its control signals over an LSM control bus 62 that is part of MISA bus 37 on backplane 24. LSM control bus 62 consists of four address lines, a read control signal, a write control signal, a chip select signal, and a reset signal. The four address lines are received after the station port module has decoded a 24-bit MISA address bus. These incoming address lines are then decoded by control decode block 60 and data is either read from or written to the LSM registers (to be more fully described later).

Configuration registers 52 contain the port configuration data which controls the operation of the 38:1 multiplexers in multiplexer block 58. There are twelve 12-bit configuration registers 52, one for each of the twelve ports of station port module card 28. By writing to these registers, controller module 26 configures the switches to establish the desired interconnections among the stations connected into the ports of the port module cards. Port configuration data, which is encoded on MISA bus 37, is buffered and written to the 12-bit configuration registers 52. Bits 5:0 of the configuration register hold a value in the range 0–37. This value determines which of the 38 multiplexer inputs will be selected by the associated 38×1 multiplexers in multiplexer block 58. Bit 6 is the port enable bit and determines whether the port's output buffer is enabled or disabled, i.e., whether that multiplexer is electrically coupled to its assigned port. In other words, bit 6 of the configuration registers are used to select which of the four LSM chips 50 is driving a particular port. If bit 6 is set to 1, then the port is enabled. If bit 6 is sey to 0, the port is disabled. To avoid having more than one LSM chip 50 driving a port's output bus simultaneously, only one of the LSM chip's is permitted to have a 1 in the bit 6 position of that port's configuration register. Within an LSM chip, each port can be enabled independently of all other ports. Thus, it is up to the software to make sure that only one chip enables any given port.

Updating port configurations requires two register writes by software to configuration registers 52 within each LSM chip 50. The first write sets bit 6 to 0 in each chip's configuration registers 52, disabling each port output. The second write establishes the correct configuration by enabling one LSM chip's port outputs.

The following is an example of the output enable function. Referring to FIG. 3, assume that port 0 is configured to receive its TRI data from port 10. In this case, LSM 0's port 0 configuration register will have bit 6 sey to 1 while LSM 1, LSM 2, and LSM 3's port 0 configuration registers will have their bit 6 set to 0. Now, assume port 1 is reconfigured to receive its TRI data from port 95. In this case, LSM 0, LSM 1, and LSM 3's port 1 configuration registers will have their bit 6 sey to 0 and LSM 2's port 1 register will have its bit 6 set to 1.

Twelve select decode blocks 54, one for. each of configuration registers 52, converts the information within the configuration registers into multiplexer control signals. Each select decode register 54 receives select data bits 5 through 0 from the appropriate one of configuration registers 52 and decodes it into 38 select lines which are used by multiplexer block 58 to determine which input line of the 38×1 multiplexer to connect to its output line.

Output enable blocks 56 then determine, under control of bit 6 in configuration register 52, which outputs of the twelve 38:1 multiplexers is enabled. There are twelve output enable blocks 56, one for each of the output paths. Each output enable block 56 includes a tri-state buffer that is tied to the output of its associated 38:1 multiplexer. This buffer is enabled or disabled based on the value of data bit 6 in configuration register 52 for that output path.

B. Controller

Controller 26 is the control and processing element of the wiring manager 14 and is responsible for executing all operating software, controlling the resident port module cards, monitoring wiring manager component status, and communicating with LMS 12. Controller 26 has two logical sections: a processor section 64 and an MID (Memory, Interrupt and Decode) section 68.

Processor section 64 controls wiring manager 14 and executes all operating software. This section consists of the processor, its required PC-AT memory, support functions (e.g. timer, COM1, etc.), and buffers to the MISA bus. Since this section directly interfaces to backplane 24, it is designed to be 'hot insertable'.

Processor section 64 is based on 80386SX CPU running at 16 MHz and is PC-AT compatible. This section conforms to the AT memory map and is capable of running AT software. It supports a standard BIOS which has been adapted to execute without mass storage devices such as floppy or hard disk and without a video interface or keyboard interface.

Processor section 64 supports at least one RS232 port configured as a PC-AT COM1 port which handles full duplex ASYNC data at speeds from 1.2 Kb to 19.2 Kb. COM1 is designed for use as the link to LMS 12.

MID section 68 supports the controller functions required for port modules 28 and 30. It also provides non-volatile memory, interrupt translation and extended ROM. This logical section interfaces to MISA bus 37 (as opposed to directly sitting on the internal processor bus), allowing the processor section to view this section the same way it views the other slots in wiring manager 14. This section generates signals for MISA bus 37 that are not PC-AT compliant.

Since processor section 64 provides strictly an AT compatible bus, MID section 68 supports the other signals that are required for port cards 28 and 30.

Figure 8:
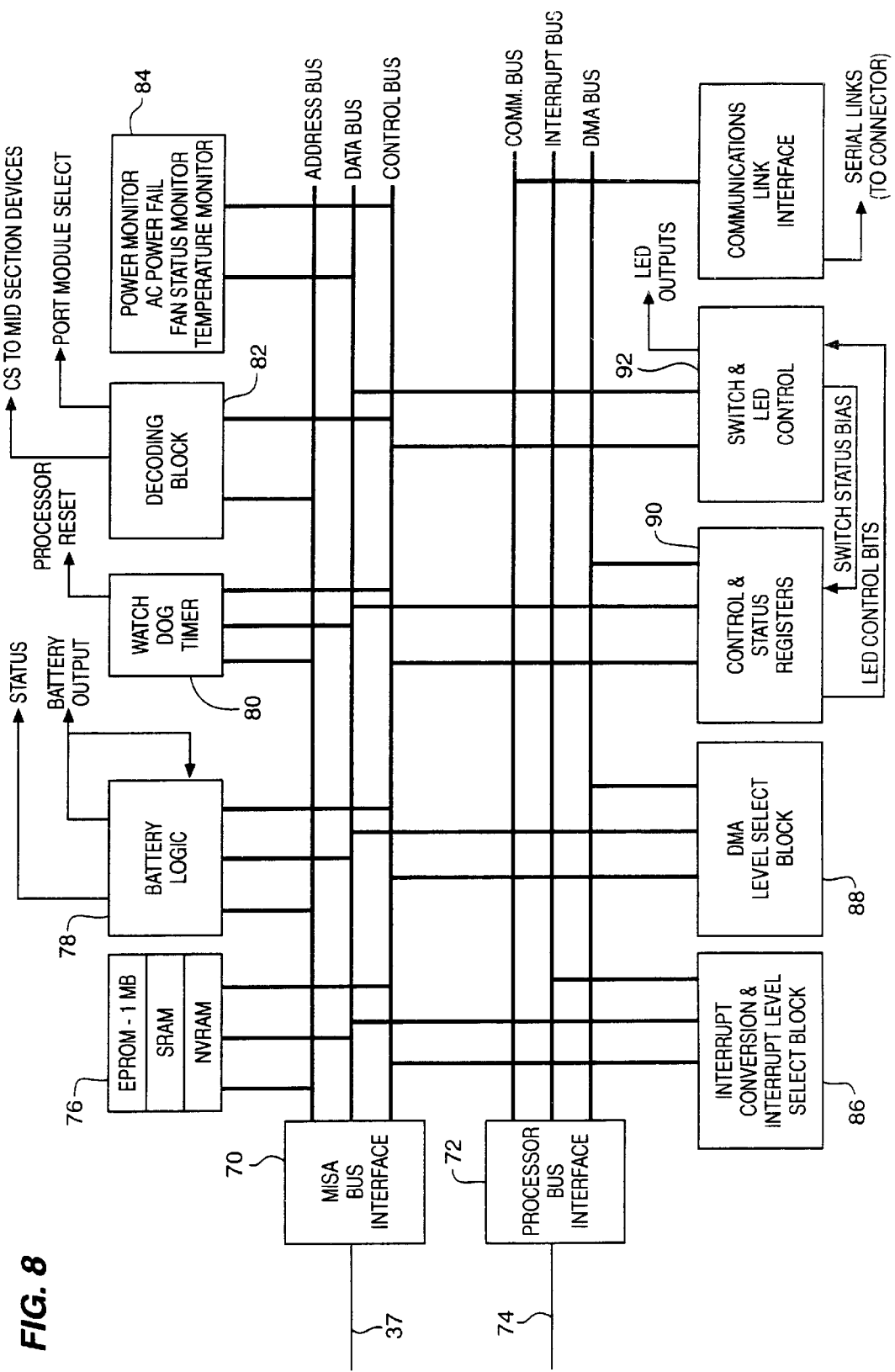
FIG. 8 is a block diagram of the MID section of the controller module.

As shown in the block diagram of FIG. 8, MID section 68 includes the following major blocks:

(1) a MISA bus interface 70 that provides an interface to MISA bus 37 in backplane 24;

(2) a processor bus interface 72 that provides an interface to an internal processor bus 74;

(3) a memory block 76 which includes EPROM and SRAM;

(4) a battery back-up module 78 that provides back up for the SRAM;

(5) a watch dog timer 80 to reset processor 64 after a time out occurs;

(6) a decoding block 82 that performs the required decoding for the MID section and also generates a port module select signal indicating that the address is intended for the port module cards;

(7) a monitor block 84 that monitors the output of the power supplies, the status of AC power, temperature, and fan status;

(8) an interrupt block 86 that performs level to edge conversion and AT interrupt level selection;

(9) a DMA (direct memory access) block 88 that includes DMA level section logic;

(10) a register block 90 that includes control and status registers; and

(11) a switch & LED control module 92 that controls LEDs on the front panel of controller 24 and reads the status of switches in MID section 68.

Some of these blocks will now be described in greater detail.

1. Memory

Memory block 76 provides up to 4 Mb of available memory above the 640 K normally expected in a PC-AT. The EPROM in memory block 76 is a 1 MB of memory which contains the operating system and application software. The SRAM in memory block 76 is 64 KB (expandable to 128 KB) and maintains the network configuration and other information in the event of a power failure. The SRAM also has provisions to read the status of the battery. Memory block 76 also includes NVRAM to maintain its data for at least 400 hours with system power down.

2. Watch Dog Timer

Watch dog timer block 80 performs the standard normal functions of such a timer. It has a period of at least 1 second. If the timer overflows, it asserts the reset signal of the processor, and causes a controller module reset (it does not affect the reset signal on the backplane). After a reset (either asserted by the reset switch or a power on reset), watch dog timer 80 is disabled. An individual control register controls watch dog timer 80. The register includes: a watch dog timer (WDT) Disable bit that is used to disable the watch dog timer, and a WDT reset bit that is used to reset the watch dog timer. A WDT Ovr bit found in a status register located elsewhere in controller module 26 (to be described later) reflects the state of the watch dog timer.

3. Power Monitor Block

Power monitor block 84 monitors the status of the +12V and the 12V supply from the two power supplies. This block also generates a power ON reset for controller module 26 and also differentiates a system power up from a module power up.

4. Registers

Register block 90 includes status and control registers that indicate the status and control the state of the system. The status of the controller module is cleared following power-up condition and when a RESET switch (not shown) is asserted. The NVRAM, however, is not altered during power-up tests if it contains a valid configuration.

Each controller module is also provided with an unique ID. This ID is software readable and its value is identical to the Controller serial number for each card.

Figure 9:
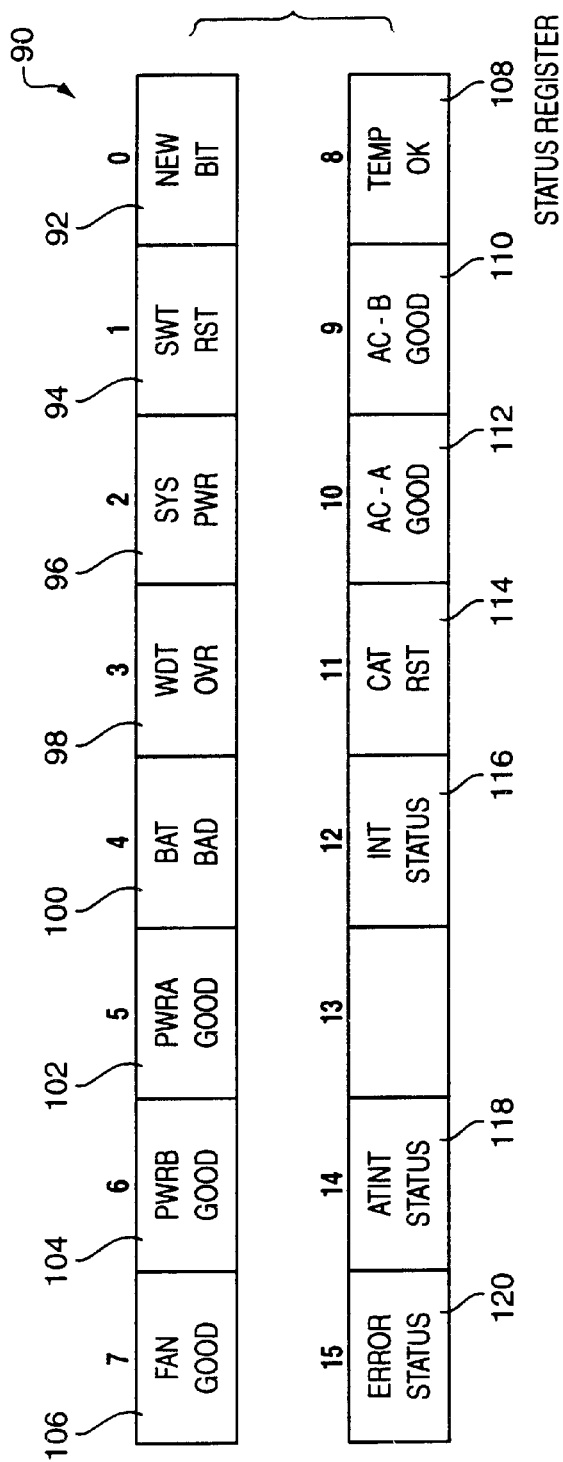
FIG. 9 is a 16-bit status register within the controller module to indicate the status of the system and of the controller module.

Referring to FIG. 9, status register 90 is a 16-bit register that indicates the status of the system and controller module 26. The following is a brief description of each bit and its function.

A NewBit bit 92 indicates whether the controller module is "new", i.e., whether it has just had power supplied to it. This bit is cleared if controller module 26 or the system has been powered ON. Software sets this bit but cannot clear it.

A software reset (SwtRst) bit 94 indicates whether the reset switch has been asserted. It is set if the reset switch is asserted. Software clears the bit but cannot set it. Hardware clears SwtRst bit 94 after a Power ON (for both system and module power ON).

A system initialization (SysPwr) bit 96 indicates whether the controller module must be initialized. This bit is provided to differentiate between a system power up and a controller module power up. It makes use of the delay between the power status signals and the power itself. Hardware clears this when the system power has been turned ON and it sets this bit if the controller module is inserted into a live system (system with power already on). Software can set this bit but cannot clear it. Its status is not affected by the reset switch.

A watch dog timer overflow (WDTOvr) bit 98 indicates the status of the watch dog timer. This bit is set if the timer overflows and software can clear the bit but cannot set it.

A battery bad (BatBad) bit 100 indicates the status of the battery. It is set if the battery voltage output drops below a preselected level (e.g. 2.5V).

A power supply A good (PWRAGood) bit 102 and a power supply B good (PWRBGood) bit 104 indicate the DC output status of the dual power supplies. These bits are set if the corresponding power supplies are functioning and are cleared if the corresponding power supplies fail.

A fan good (FanGood) bit 106 indicates the status of the FAN unit. It is set if the fan is functioning normally and cleared if the fan fails. Note that this bit is the combined status of three FAN status signals from the FAN unit.

A temperature okay (TempOK) bit 108 indicates whether the ambient temperature is within a proper range. It is set if the temperature is within limits and cleared if the temperature crosses the limits.

An AC_AGood bit 110 and an AC_BGood bit 112 indicate the status of the AC input to power supply A and power supply B, respectively. These bits are set if the AC input is normal and they are cleared if not normal.

A catastrophic reset (CatRst) bit 114 indicates whether a catastrophic reset has been requested by the user. This provides a mechanism by which a user can indicate that the NVRAM should be cleared and tested during power-up. A catastrophic reset is requested by simultaneously asserting the reset and the LEDtst switches on the controller module. CatRst bit 114 is set if the catastrophic reset is asserted and software clear this bit but cannot set it. It is cleared after a power on or a switch reset occurs.

An interrupt status (INTStat) bit 116 indicates the status of the INT interrupt signal in the MISA bus. This is a read only bit that is not affected by a reset or mask bits (described elsewhere).

An AT interrupt status (ATINTStat) bit 118 indicates the status of the ATINT signal in the MISA bus. Like INTStat bit 116, it is a read only bit that is not affected by reset or the mask bits.

An error status (ErrorStat) bit 120 indicates the status of the ERROR signal in the MISA bus. When active (i.e., when set), it indicates that there has been a parity error detected in the system. It is cleared on a power ON and after a switch reset.

Figure 10:
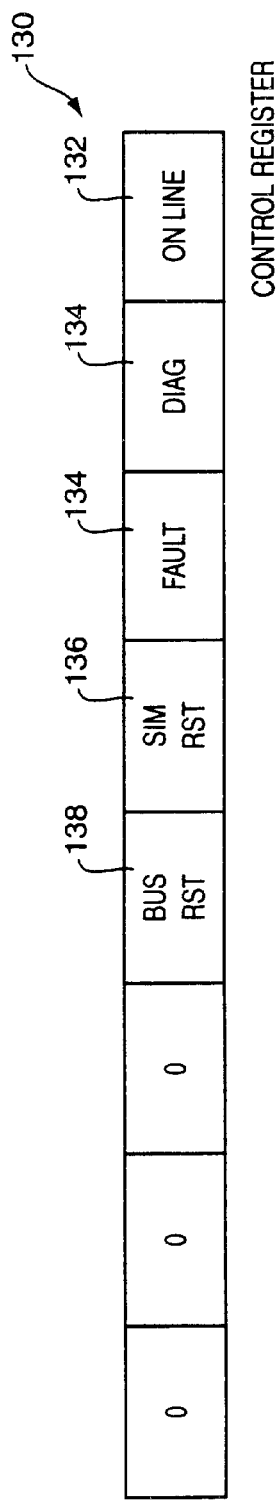
FIG. 10 is an 8-bit control register within the controller module.

As shown in FIG. 10, control register 130 is an 8-bit register. The register includes bits which control LEDs on controller module 26, namely, an OnLine bit 132 that controls an OnLine LED, a DIAGS bit 134 that controls a DIAGS LED, and a FAULT bit 136 that controls a Fault LED. The OnLine LED indicates whether controller module 26 is on line, The DIAGS LED indicates whether diagnostics is being performed by the software, and the FAULT LED indicates whether a fault has been detected.

Each of the bits turns on or turns off the corresponding LED depending on whether the bit is set to one or set to zero, respectively. Both OnLine bit 132 and DIAGS bit 134 are cleared after a reset. Typically, diagnostic software sets DIAGS bit 134 before performing the diagnostics. With regard the FAULT bit 136, hardware sets that bit after a reset or after a Watch dog timer overflow and software sets the bit in the event of a controller module failure.

Control register 130 also includes a SIMRST bit 136 that causes controller module 26 to simulate a controller module power ON when set to one. Normal operation occurs when SIMRST bit 136 is in a cleared state. Setting this bit hits the power ON reset signal and causes a complete controller module reset, including a processor reset. The bit automatically gets cleared during the process.

Finally, control register 130 includes a BusRst bit 138 that controls a station port module reset signal in the MISA bus.

Setting this bit to one asserts the station port module reset signal, causing a reset of all the other modules in the system. Clearing the bit de-asserts the station port module reset signal. The bit does not, however, affect the state of controller module 26 and it is cleared after a reset occurs.

The following is a brief description of the action and effect of the reset bits in status register 90. Note that software makes sure that these bits are reset to the inactive state after reading them.

| EVENT | EFFECT |
| --- | --- |
| Power On to the controller | NewBit and Fault bits set, (only) controller module reset |
| System Power on | NewBit & SysPwr & Fault bits set controller module reset |
| Reset switch asserted | SwtRST & Fault bits set, controller module reset |
| Reset & LEDTST asserted | NewBit & CatRst & Fault bits set |
| Watch Dog timer overflow | WDTOvr & Fault bits set, controller module reset |

5. Memory Map of the Wiring Manager

Figure 11:
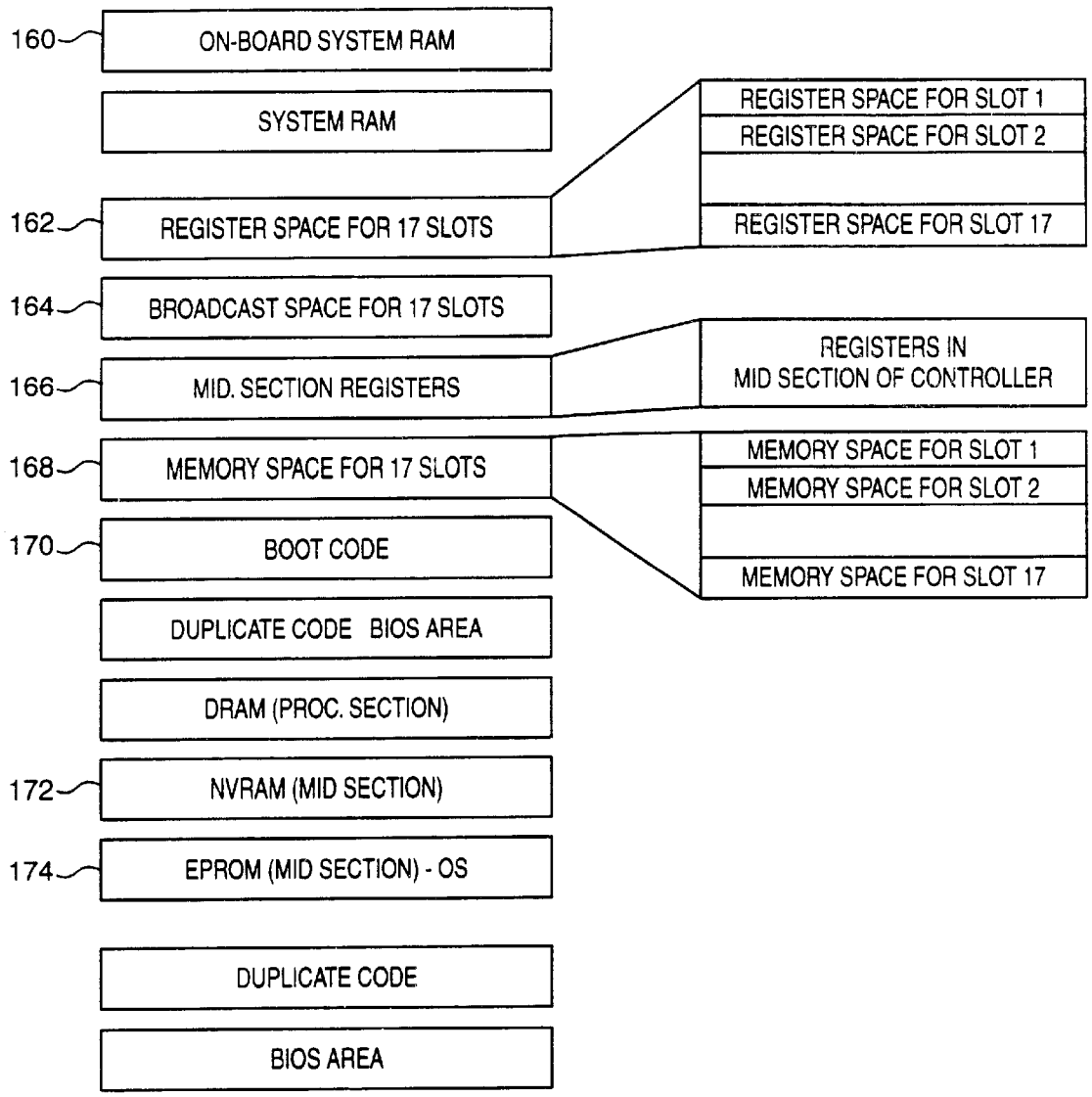
FIG. 11 is a memory map of the controller module and the wiring manager.

The memory map of wiring manager 14 in general and controller module 26, in particular, conforms to the AT system memory map. The relevant blocks within the memory map are shown in FIG. 11. All registers in port module cards 28 and RI/RO module cards 30 are memory mapped.

Memory space 160 is dedicated to the Processor section of the controller module and is used by BIOS as System RAM.

Memory space 162 is allocated for register space on the remaining card slots in wiring manager 14. Each of the 17 card slots has a segment of register only space, which is used for card specific registers (described elsewhere).

Memory space 164 is allocated for broadcast space on station port module-cards 28. This space is a write only space and no read operation is performed in this area.

Memory space 166 is allocated for MID section 68 of controller module 24.

Memory space 168 (128KB, 4KB for each of 17 slots) is for memory space for the port module slots. This space may be used by cards which have on-board memory (non-executable) which the controller can access directly.

Memory space 170 is reserved for EPROM containing boot code. The reason for assigning this space for the boot code is that BIOS, after running Power On Self Test (POST) code, looks for code in this area. If BIOS finds code in these locations, it transfers control to this code. Thus, by having the boot code in this area the boot code will execute following POST.

Memory space 172 of non-volatile memory (NVRAM) is provided in MID section 68 of the controller module 26. Out of this space only 128 KB is decoded and used. The rest of the memory space in this area is folded back.

The wiring manager operating system is located in memory space 174 (EPROM) owned by MID section 68.

The rest of the memory space is allocated to BIOS as required by the BIOS/AT specifications.

6. Interfaces

Figure 7:
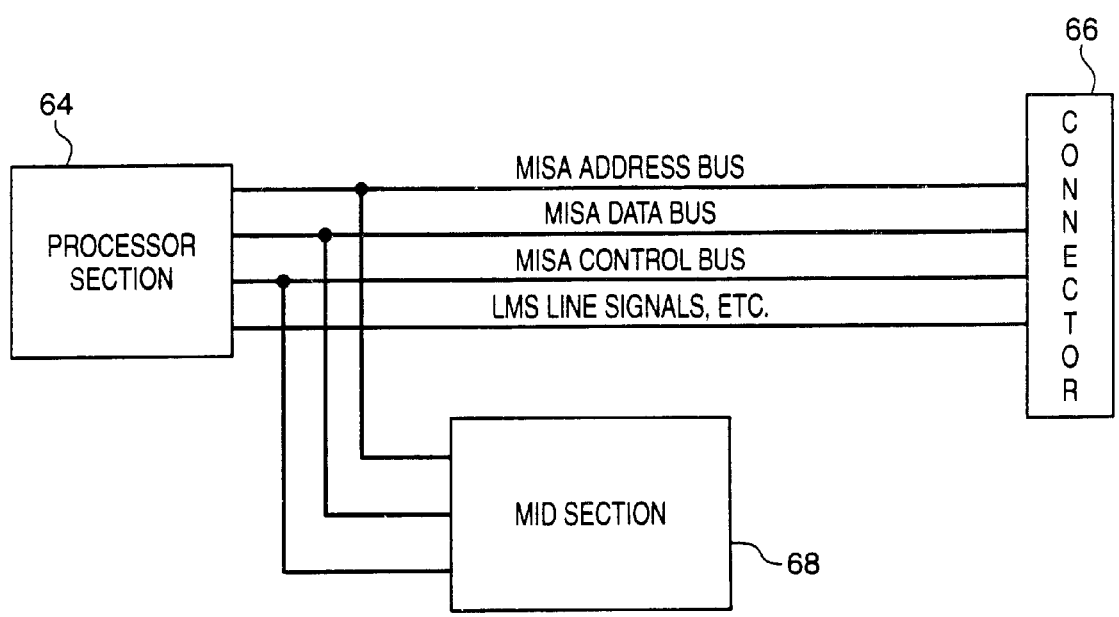
FIG. 7 is a block diagram of the controller module.

Controller module 26 interfaces to the rest of wiring manager 14 through a MISA bus connector 66 (See FIG. 7) to backplane 24. It connects to the LMS through the WM-LMS link. It also provides a front panel which supports link connectors and the LEDs. Each of these will now be described.

The MISA bus interface to backplane 24 has two logical sections, MISA and Port. Controller 26 is the master of MISA bus 37. (Note that MISA bus 37 is AT compatible bus and its signals are a superset of the AT bus.) MISA bus 37, which is a synchronous bus with the normal access cycle approximately 250 ns, supports two DMA channels and one edge sensitive interrupt signal. Any station port module card 28 requiring longer access times asserts a "Card Ready" signal.

The front panel (not shown) of controller module 26 supports the LEDs, switches, the connector for the WM-LMS link, and the console port. A RESET switch resets the state of the controller module to a known state. Asserting the RESET switch does not affect the SYSTEM RESET line on backplane 24. A LEDTST switch asserts the LEDTST_L signal on backplane 24 and it, in turn, causes all the LEDs in system to come ON. Asserting both the LEDTST and the RESET switch simultaneously sets a status indicator in the status register that is used to indicate a "catastrophic reset" condition which clears and tests the NVRAM.

The registers of the port module cards are mapped to the memory space of controller module 26. To determine status of the port module cards or to control the configurations implemented by those cards, controller module 29 either reads from or writes to the appropriate locations in its memory space (i.e., the port module card registers). The details about the registers within the memory space assigned to the port module cards is provided in the section which describes the port module cards.

C. Backplane

Backplane 24 of wiring manager 14 is a controlled impedance backplane that interconnects the various modules of the system. Backplane 24 has three logical sections. One section is the control section (i.e., Modified Industry Standard Architecture bus—MISA bus 37) which carries the address, data and control bus from controller module 26 to the rest of the system. This section is electrically compatible with the Industry Standard Architecture (ISA) bus or more commonly called the AT bus. The signals in this bus are a superset of the ISA bus. In general, MISA bus 37 consists of the following signals.

System address lines
System data lines
System read/write lines
System control lines
Interrupt lines
Control lines A more detailed description of the MISA bus signal lines can be found in Appendix I, attached hereto.

MISA bus 37 interfaces to all the cards in the system. Processor section 64 of controller module 26 is the master of this bus and generates all the address and control signals. The bus, however, has provisions for DMA. It has two DMA channels that the port module can use. These DMA requests can be routed (by software) to any desired DMA channel of the processor. MISA bus supports multiple bus masters. If the controller module is removed, all the MISA bus signals are automatically pulled to the inactive state by the backplane.

A second section of backplane 24 carries the Token Ring Information (TRI) bus 36. TRI bus 36 consists of the token ring port signals from all the ports in the system. These port signals could be either 4 Mb or 16 Mb, depending on the connected port. Each port signal is driven with two drivers from the port cards. One driver drives the signal to all the cards to the left of it in the system and the other driver drives the signal to all the cards to its right. Removal of the controller module from the system does not affect this bus.

A third section of backplane 24 is the power supply bus 39. This bus provides for +5V, +12 and −12V to all cards and it provides power system status to controller module 26.

Backplane 24 does not have any active components on it. However, it does have the required passive termination devices, connectors and capacitors. To achieve good signal quality for the backplane signals in general and the port signals in particular, backplane 24 is a controlled impedance backplane. To reduce crosstalk between the signals and the radiated emissions, the backplane has at least 8 layers. The layer stack-up is as given below.

Layer 1—GND/VCC plane
Layer 2—Signal layer
Layer 3—GND/VCC plane
Layer 4—Signal layer
Layer 5—GND/VCC plane
Layer 6—Signal layer
Layer 7—GND/VCC plane
Layer 8—Signal layer Since the frequency of operation of TRI bus 36 is much higher than the signals in MISA bus 37, terminations are provided on backplane 24 to prevent reflections and each port module card drives 12 backplane signals using FAST drivers and receivers. The port signals interface to all the cards in the system except the controller module. Due to the frequency of operation of these signals, the drivers and receivers used for this bus are provided with sufficient de-coupling capacitors. The drivers on each card are placed as close as possible to the backplane connectors. The tracks from the connector to these drivers/receivers are kept short to minimize capacitance and stub effects.

Both the MISA bus and the TRI bus are terminated at the end of the signal etch with a termination network. The MISA bus signals are all terminated with a pull-up/pull-down combination (i.e., a 110 ohm–220 ohm resistor pair). This insures that the states of all signals are inactive when the controller module is removed from the backplane. The port signals are terminated with a 60 ohm pull down resistor matched to the impedance of the backplane.

Backplane 24 has provision to interconnect 18 slots. All the slots in the system (except the controller slot) has a 5 bit slot ID which the module in the slot uses as its slot address.

The module responds to a processor access by using the slot ID and the address lines in the MISA bus. The controller slot has a 5 bit backplane ID that is readable by the processor.

D. Functional Overview of the Port Module Cards

Figure 12:
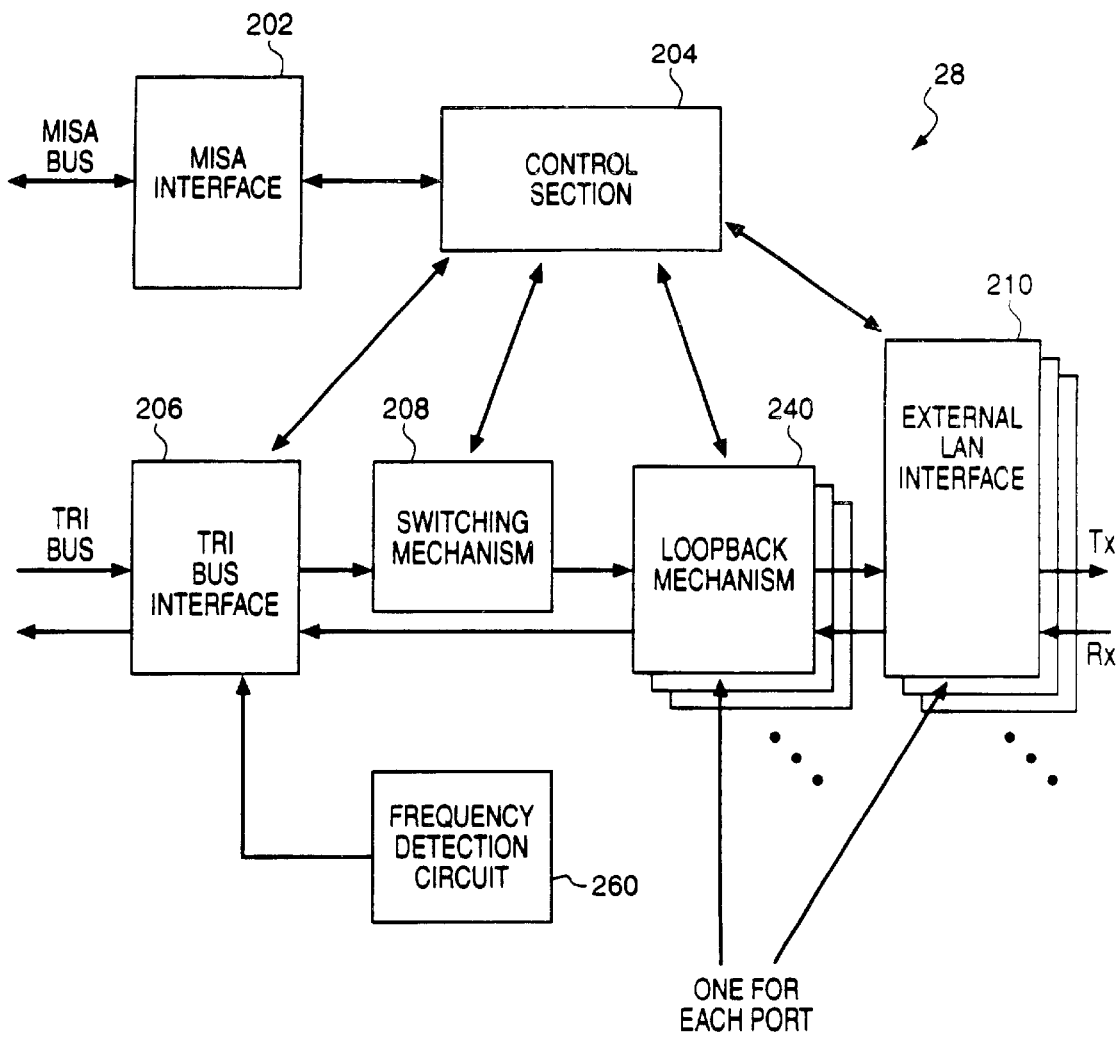
FIG. 12 is a block diagram of a station port module card that plugs into the wiring manager.

Referring to FIG. 12, station port module cards 28 provide the hardware to implement the trunk coupling and switching functions for wiring manager 14. Each station port module card has twelve connectors on the front panel to interface to the customers LAN. The modules can be plugged into any of 12 port module slots in backplane 24. The token ring module described in this embodiment interfaces to the MISA, TRI and power busses resident in wiring manager backplane 24.

Station port module card 28 includes a MISA interface 202 that provides controller module 26 with access to a control section 204 within port module card 28. Port module card 28 is a slave to controller module 26 which is the bus master. MISA interface 202 consists of bus control logic and FAST bus drivers and receivers arranged to conform to the MISA requirements. The port module's data bus interface remains tri-state unless the module has been addressed.

Port module card 28 also includes a Token Ring Information Bus Interface 206 that provides a connection from TRI Bus 36 in backplane 24 to that port module card. All 152 TRI Bus signals are received by port module card 28 and passed to a switching mechanism 208, the details of which were provided earlier. Each of the 12 ports on port module card 28 also take the signal it receives from a LAN Interface 210 and drives that Received LAN Signal onto the TRI Bus. The Received LAN Signal is transmitted onto the TRI bus using two drivers (refer to FIG. 2). One driver transmits the signal to the right on backplane 24 and the other driver transmits the signal to the left on backplane 24. Ports on the same card are considered to be on the left side of the backplane.

Figure 13:
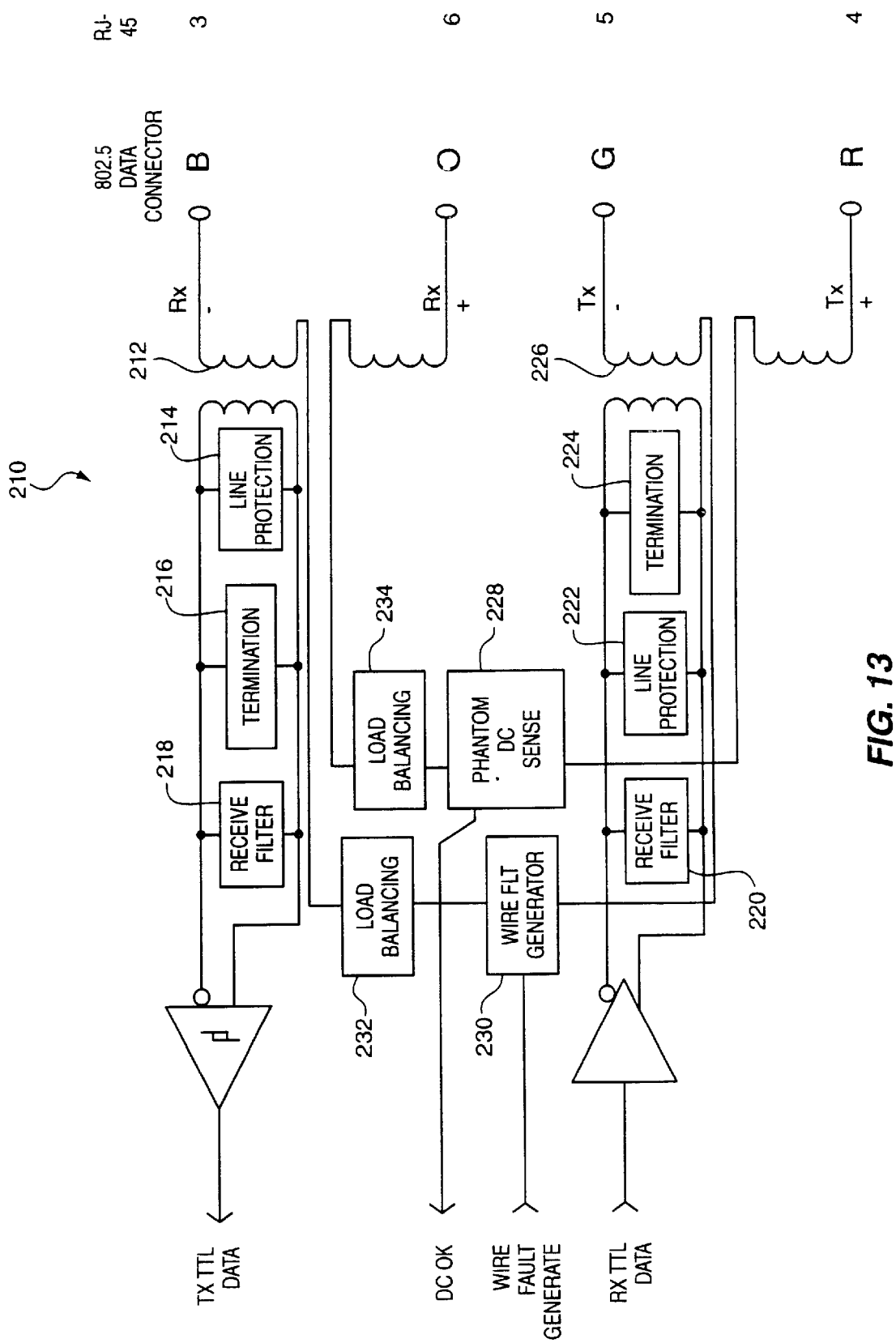
FIG. 13 is a block diagram of the external LAN interface found within a station port module card.

Each of the 12 ports on a port module card 28 has its own external LAN interface 210 that provides the proper hardware to link port module card 28 to the external token ring LAN. Also referring to FIG. 13, each external LAN interface 210 receives the token ring signal from the attached station on O (orange) and B (black) pins of the connector. The B and O designations are part of the IEEE 802.5-1989 specification. The received signal passes through isolation transformers 212, a line protection circuit 214, a termination circuit 216, and a receive filter 218 before being converted from differential to TTL levels. The TTL received signal is then sent directly to TRI Bus Interface 206 (see FIG. 12).

External LAN interface 210 takes the TTL level transmit signal from switching mechanism 208 and converts it to a differential signal. This differential signal passes through a transmit filter 220, a line protection circuit 222, a transmit termination circuit 224 and isolation transformers 226 before being sent out R (red) and G (green) pins of the interface connector. The R and G designations are also part of the 802.5 specification.

Termination circuits 216 and 224 are designed such that the 4/16 Mb STP ports have impedance matching and terminations for 150 Ohm shielded twisted pair and the 4/16 Mb UTP ports have impedance matching and terminations for 100 Ohm unshielded twisted pair. Line protection circuits 214 and 222 protect the ports from minor overvoltages. Receive filter 218 is a basic differential equalizer that removes cable induced jitter from the input signal and it is used on the 4/16 Mb STP and UTP ports. Transmit filter 220 reduces common and differential mode noise on the transmitted signal. Filter 220 also provides waveshaping to reduce the high frequency harmonics transmitted on the unshielded twisted pair. Isolation transformers 212 and 226 provide isolation from and impedance matching with the token ring LAN.

Also within external LAN interface 210, a phantom DC sensing circuit 228 monitors the DC voltage level received from a connected station. It generates the DC_OK status signal which controls the loopback section to be described shortly. The DC_OK signal indicates whether the voltage is at a "High" or "Low" as defined by IEEE 802.5-1989. A "High" phantom DC signal indicates that a station is requesting to be inserted onto its assigned network. Phantom DC sensing circuit 228 is electrically isolated from the external LAN by an optocoupler.

A wire fault generator 230 provides a mechanism by which software can create a "wire fault" condition on the lobe cable, which in turn can be detected by the connected station. Upon detection of a "wire fault" condition, the station should de-insert itself from the network. The station can then be placed on a new network, and will follow the normal "open" for insertion onto the new ring. Without this mechanism, a station could be moved from one network to another without the station's knowledge, which would bypass the station's logging onto a server, requesting configuration parameters from a network manager. A "wire fault" is created by causing the load seen by the station's "phantom DC" circuit to be too high and out of range for station insertion. When the station sends phantom it will see a wire fault and then de-insert. The conditions that cause a station to see wire fault are specified in the *TMS380 Adapter Chipset User's Guide, Revision D, July* 1986, Texas Instruments, page A-101 and the *TMS 38053 Ring Interface Circuit* data sheet, March 1989, Texas Instruments, page 13.

Finally, load balancing circuits 232 and 234 provide the attached station with the expected load when wire fault generator 230 is off. Load balancing circuits 232 and 234 cause the DC static load at the connector between pins B & O and R & G to be within the limits specified by IEEE 802.5-1989.

1. Loopback Section

Referring to FIG. 12, external LAN interface 28 includes a loopback section 240, one for each port on station port module card 28. Loopback section 240 is a hardware circuit designed to control a station's trunk coupling when the controller module has failed or is removed. When enabled this mechanism takes the currently selected LAN signal from the backplane and loops it back to the backplane. At the same time it takes the signal from the external LAN and loops it back to the external LAN. This circuitry is fully controllable by software.

Figure 14:
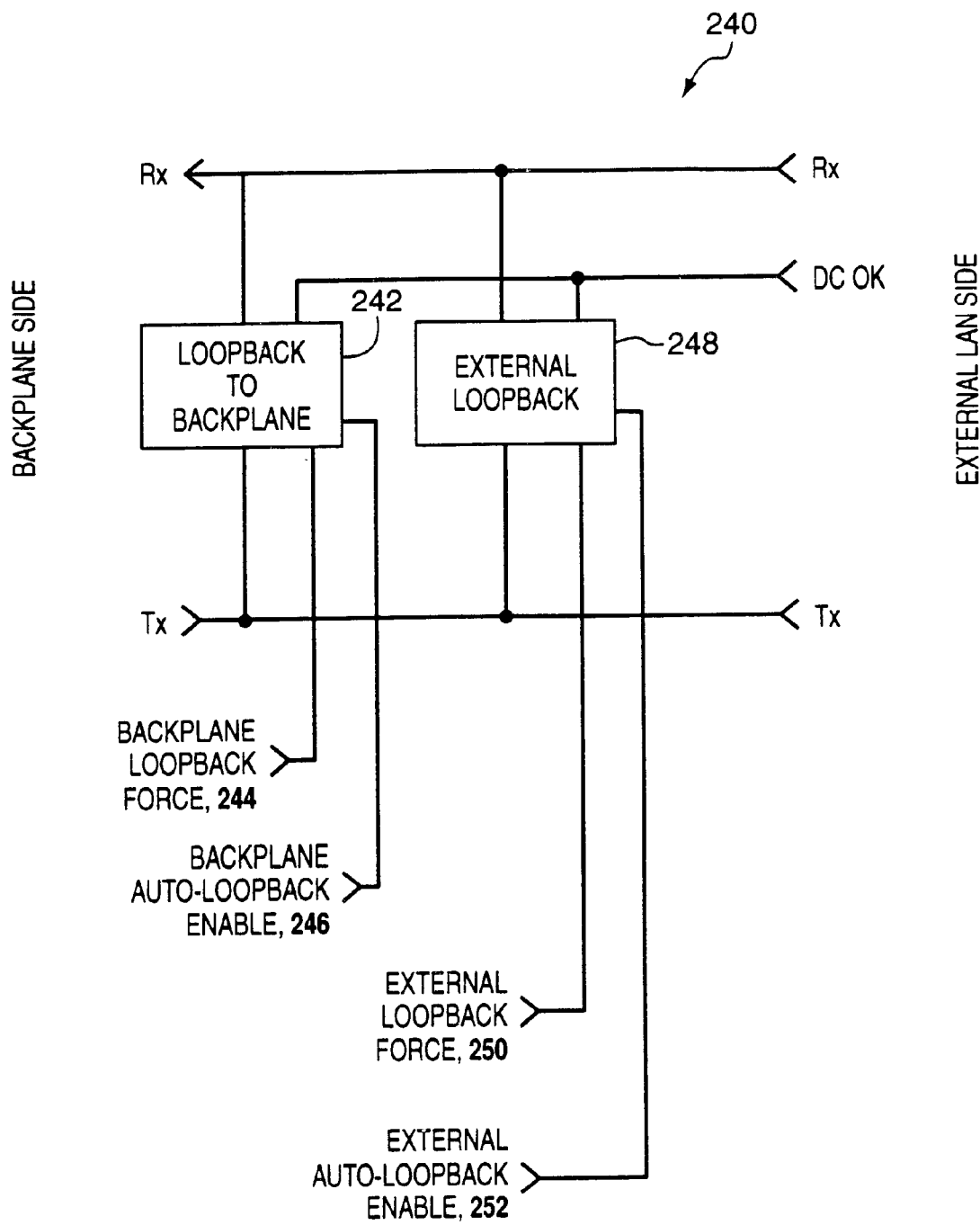
FIG. 14 is a block diagram of the loopback section within the external LAN interface.

Referring to FIG. 14, loopback section 240 includes a backplane auto-loopback circuit 242 controlled by the DC_OK signal and having a Backplane Loopback Force input 244 and a Backplane Auto-Loopback Enable input 246. Loopback section 240 also includes an external auto-loopback circuit 248 controlled by the DC_OK signal and having an External Loopback Force input 250 and an External Auto-Loopback Enable input 252.

When External Auto-Loopback Enable input 252 is high, the DC_OK signal controls external auto-loopback circuit 248. If the DC_OK signal is high, circuit 248 is off; whereas, if DC_OK goes low, circuit 248 is automatically turned on thereby looping back the signal onto the port.

When External Auto-Loopback Enable input 252 is low, external auto-loopback circuit 248 is turned on and off with the External Loopback Force bit in a register in the station port module card.

When Backplane Auto-Loopback Enable input 246 is high, backplane auto-loopback circuit 242 is controlled by the DC_OK signal. If the DC_OK signal is high, circuit 242 is off; whereas, if DC_OK goes low, circuit 242 is automatically turned on thereby looping back the signal onto the backplane.

Finally, when Backplane Auto-Loopback Enable input 246 is low, backplane auto-loopback circuit 242 is turned on and off with the Backplane Loopback Force bit, also found in a register in the station port module card.

2. Control Section

Control section 204 of station port module card 28 provides the address decoding, control and status registers, interrupt generation and masking, frequency detection and reset circuit for the module. Each of these functions will now be described in greater detail beginning with the registers.

A hierarchical addressing scheme is used, The MISA bus supplies a 24-bit address to backplane 24 and each card which is connected to backplane 24 decodes the address to determine whether the address is within its address space. The station port module card does most of the decoding of the 24-bit address and it determines for which of the four LSM chips 50 the address is intended. Once the relevant LSM chip is identified, station port module card asserts a select chip signal for that LSM chip 50 and passes the relevant 4-bit address to that chip, identifying one of the registers within the selected LSM chip 50.

The controller looks at the upper 17 bits of the address on the 24-bit MISA address lines to determine whether the address is meant for any register within its address space, i.e., a register on any of the station port module cards or RI/RO modules cards connected to the backplane which it controls. If it determines that the address is intended for one of the cards, the controller card asserts a signal on a MISA signal line indicating to the cards that the address is meant for one of them.

A card supports up to 256 16-bit registers. If the address is meant for one of the cards as indicated by a signal asserted on the MISA bus, each card then looks at the lower five bits of the upper 17 bits to determine whether its slot ID is being identified. If the card does not recognize its slot ID, it does no further decoding of the address. If the card recognizes its slot ID (assuming the ONE line is asserted), the card allows the signals on the lower seven lines to come onto the card where it is decoded. The upper three bits of the seven bit address signal coming onto the card determines whether the address is intended for any one of the LSM chips or for other registers on the card. If any one of the four LSM chips is identified by those three bits, the address on the lower four signal lines of the address bus are passed to the identified LSM chip which then decodes them to determine which of its 16 registers is being addressed.

3. Port Module Address Map

Figure 15:
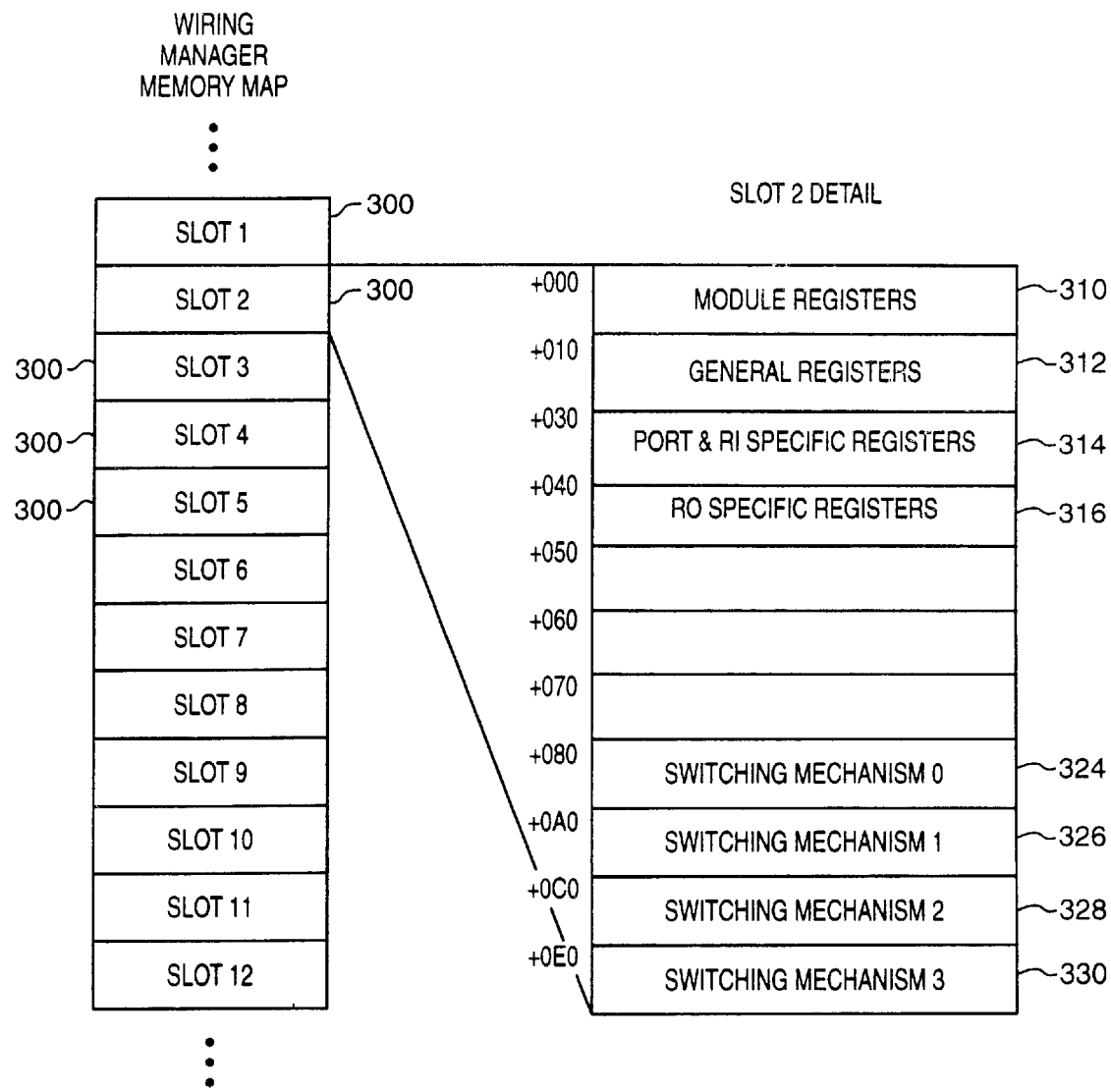
FIG. 15 shows a port register map identifying the location of the port module registers.

FIG. 15 shows a map of a portion of the memory space of the wiring manager which contains the port registers. The relevant segment of the wiring manager's memory space contains a set of contiguous memory blocks 300, each one assigned to a different one of the slots supported by the wiring manager (labelled SLOT 1 through SLOT 12). Each memory block 300 is, in turn, subdivided into regions each associated with a different set of port module registers within the port module cards. As indicated, the registers fall into identifiable groups including module registers 310, general registers 312, port and RI specific registers 314, and RO specific registers 316. At the high end of each memory block 300, segments of memory 324–330 are allocated for the four switching mechanisms (i.e., the four LSM chips) on the port module card. The memory segments allocated to the switching mechanisms are also labelled switching mechanism 1 through switching mechanism 4 in FIG. 15. Each switching mechanism segments includes twelve port configuration registers and various test related registers. A more detailed description of the port module memory map is presented in Appendix II, which will be referred to throughout the following discussion.

Each port module card 28 provides decoding so that all of its registers may be accessed from the MISA bus. A slot ID is provided to each inserted port module by the backplane. The slot ID is unique to each slot available in the wiring manager. The module uses this ID to determine its base address for all MISA bus functions.

Module registers 310 always exist on all port card types. Module registers 310 include a module type register, a status and control register and a reset register, each of which will now be described.

All cards in the system, other than controller module 26, have a module type register located at the 'base address+0'. This register serves two purposes: it tells controller module 26 that a card is present in that slot and it tells the type of the card. The module type register contains a parity bit, identifications of type and subtype, and a version number.

The status and control register is located at the 'base address+2'. This register contains the following general status bits in the identified bit positions.

In bit position 0, an Initialized bit indicates whether the module has been initialized. The Initialized bit is cleared whenever the module is reset and software may write this bit as a 1 or 0.

In bit position 1, a Backplanes Present bit indicates whether all of the necessary backplanes are present.

In bit position 2, an Online bit controls an Online LED on the module's control panel. The Online LED indicates when the port module card is online and should not be removed.

In bit position 3, a Diagnostics bit controls a Diags LED on the control panel. The Diags LED is used to indicate when diagnostics are running.

In bit position 4, a Fault bit controls a Fault LED on the control panel. The Fault LED goes on whenever a system reset is received (either from the controller module or from insertion of the port card into a hot system—power up. After a system reset, the LED stays on until it is turned off by the software. This causes the Fault LED to remain on after a system reset if the port module card cannot be accessed by the controller module. Individual module resets do not turn on this LED.

In bit position 5, a Test Interrupt bit determines whether the module generates a test interrupt.

In bit position 6, a Phantom POS Interrupt (also called a High Priority Interrupt indicates whether a falling edge phantom interrupt has occurred on the card.

In bit position 7, a Phantom NEG Interrupt (also called a Low Priority Interrupt indicates whether a positive edge phantom interrupt has occurred on the card.

The reset register is located at 'base address+4' and is used to reset the port module. Writing a one to bit zero of this register resets the module. A zero must then be written to bit zero to end the reset. While the module is being reset, none of the module functions are accessible.

General registers 312 which begin at 'base address+10' include the following 12-bit registers. Each bit of the twelve bit register corresponds to a different one of the twelve ports on the port module card. An ACT LED register contains a bit which controls an ACT LED on the control panel. The ACT LED indicates whether the port is assigned to a ring. A DC/CONN LED register contains a bit which controls a DC LED on the control panel. The DC LED indicates whether the hardware sees the phantom DC signal at that port indicating that a station is connected. The remaining four registers are associated with the previously described loopback function on the port module card.

There is a defined set of other registers which record status information about the port. A list of those registers, begin at 'base address+030'. The particular registers that are actually used for any given port module card depends upon the card type. As indicated in the fourth column of the port module register map, some registers, e.g. the Phantom DC status register located at 'base address+0038', are used on both station port cards and Ring-In (RI) cards. Other registers, e.g. the registers relating to wire fault edge interrupts, are only used on Ring-Out (RO) cards.

4. Interrupt Control

Control section 204 includes an interrupt control circuit 400 (see FIG. 16) which alerts controller module 26 to changes in status on the port module card. For example, the assertion or de-assertion of the phantom DC at any port causes the interrupt control circuit for that card to send a summary port module interrupt signal to controller module 26. Controller module 26, in turn, responds by generating an interrupt and invoking a service routine to determine the source of the interrupt and to take whatever steps are appropriate.

Figure 16:
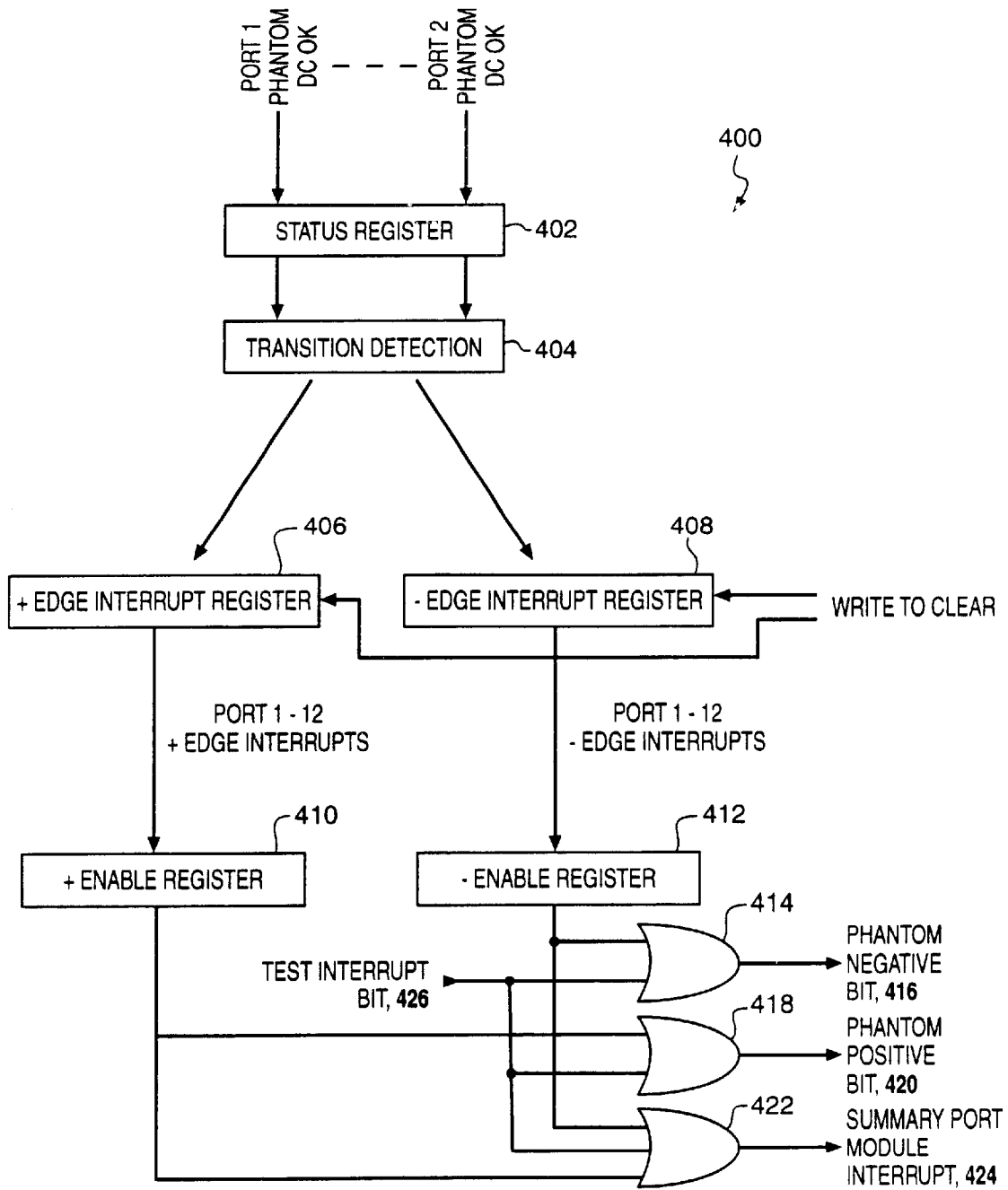
FIG. 16 is a block diagram of the interrupt control circuit on the port module cards.

Referring to FIG. 16, transition detection logic 404 in interrupt control circuit 400 monitors a status register 402. In the case of a UTP/STP Token Ring port module card, status register 402 is the Phantom DC status register located at 'base address+38'. When a change in the state of any bit in status register 402 is detected, transition logic 404 determines whether the change is characterized by a positive edge (e.g. when Phantom DC is asserted) or a negative edge (e.g. when Phantom DC is deasserted) and sets the appropriate bit in either positive (+) edge interrupt register 406 or negative (−) edge interrupt register 408. Thus, transition detection logic 404 causes any change in the state of a bit in a port status register to be recorded in an appropriate edge interrupt register.

For both positive and negative edge interrupt registers 406 and 408 there are corresponding mask (or enable) registers 410 and 412, respectively. Mask registers 410 and 412 are used to mask and unmask the edge interrupt bits in the corresponding edge interrupt registers. A zero in the mask register masks (disables) the corresponding bit in the associated edge interrupt register; a one in the mask register unmasks (enables) the corresponding bit in the associated edge interrupt register. When an edge interrupt bit is masked, it cannot generate an interrupt signal; whereas when it is unmasked, it can. An OR gate 414 OR's all of the unmasked negative edge interrupt bits together to produce a Phantom negative signal 416 that controls the state of the Low Priority Interrupt Bit in the port module cards status and control register. Similarly, an OR gate 418 OR's all of the unmasked positive edge interrupt bits together to produce a Phantom positive signal 420 that controls the state of the High Priority Interrupt Bit in the port module cards status and control register. Finally, an OR gate 422 OR's all of the unmasked positive and negative edge interrupt bits together to produce a Summary Port Module Interrupt signal 424 that is sent over the backplane to the controller module. In other words, any bit set in any edge register causes the summary port module interrupt signal to be on (provided that interrupt bit has not been disabled). The summary interrupt signal stays on until all of the set edge interrupt registers bits are cleared or disabled and enabling a set bit causes the summary interrupt signal to go on.

Also note that any bit set in the positive edge interrupt register that is enabled causes the phantom positive bit (i.e., the low priority interrupt bit) to be on in the status and control register. Any bit set in the negative edge interrupt register that is enabled causes the phantom negative bit (i.e., the high priority interrupt bit) to be on in the status and control register.

The edge interrupt bits may be cleared by writing a zero to the bit to be cleared. Writing a one to a bit in an edge interrupt register leaves that bit in its previous state.

The Summary Port Module Interrupt signals for all of the port module cards are OR'd together onto a single line on the backplane. At the controller module, the asserted signal on the summary interrupt line generates an edge interrupt back at the controller module that invokes an interrupt service routine. Since the interrupt signal could have been generated by any of a number sources, the service routine invokes a driver which scans through the registers for the port module cards, identifies which event triggered the interrupt, and takes whatever action is appropriate for that situation.

The 4/16 Mb STP, UTP and both RI/RO's Port Module cards have only a Phantom DC Status Register. There are no other interrupt sources on this module except for the Test Interrupt bit in the control register, which controls all three OR gates 414, 418, and 422.

Note that the interrupt service routine which is invoked on the controller module employs a deglitching procedure which verifies the source of the interrupt before taking further action. For example, if the interrupt service routine detects a DC ON interrupt, it compares the current state of the port, which is stored in NVRAM, with the new state as reported in the Phantom DC status register, to verify that DC has indeed gone from an OFF state to an ON state. If the comparison does not verify the DC ON interrupt, it is ignored. A similar procedure is used for other interrupt sources.

5. Frequency Detection

Control section 204 also include a frequency detection circuitry that aids in identifying the received signal bit rate from the connected port. The software checks the frequency when the phantom DC is valid at the port at insertion time. An invalid frequency measurement indicates that the station is set for the wrong frequency, has just been unplugged or has just been turned off. In any case, a port with the wrong frequency is not permitted to attach to a ring.

There is one frequency detection circuit per module and that circuit may be connected to any port on the module. The frequency detection circuit taps into the port signals that are inbound from the port on the backplane side of the loopback mechanism. The frequency detection circuit is controlled by using the energy detect register. To select which port's frequency is to be measured, the software sets the appropriate one of the twelve 'Port Select Bits' in that register. To make a frequency measurement, the software set the 'Measure Bit' to a one and then back to a zero. After 100 $\mu$s, 'Frequency Count' may be read back from the Energy Detect Register. A frequency count in a specific range indicates a 4 Mb Token Ring and a frequency count in a different range indicates a 16 Mb Token Ring.

6. Reset

Referring to FIG. 12, control section 204 includes logic for resetting the port module card. Note that the port module is reset automatically at insertion and power up and software may reset the module at any time by using the reset register. Whenever the module is reset all of the registers are put in their default states and the Initialized bit in the module status register is cleared.

III. WM—External Interfaces

A. Operating System Interface

Wiring manager 14 employs, as its operating system, VRTX32-386, from Ready Systems, Inc. Wiring manager (WM) software relies on both the memory management and inter-task messaging systems provided by the VRTX operating system. The console port is configured as IBM PC/AT COM1 compatible and is supported by the device drivers provided with the VRTX32-386 operating system. The wiring manager message service provides a message passing mechanism between tasks running in wiring manager 14. The message service is built upon the mail system provided as part of VRTX32-386. The major change is to provide for messages larger than the fixed size provided by the VRTX mail system. This is done by using the VRTX buffer management system to construct larger messages and using the mail system to send the buffer handle to the receiving task. The receiving task returns the buffer to the system after it has processed the message.

Figure 17:
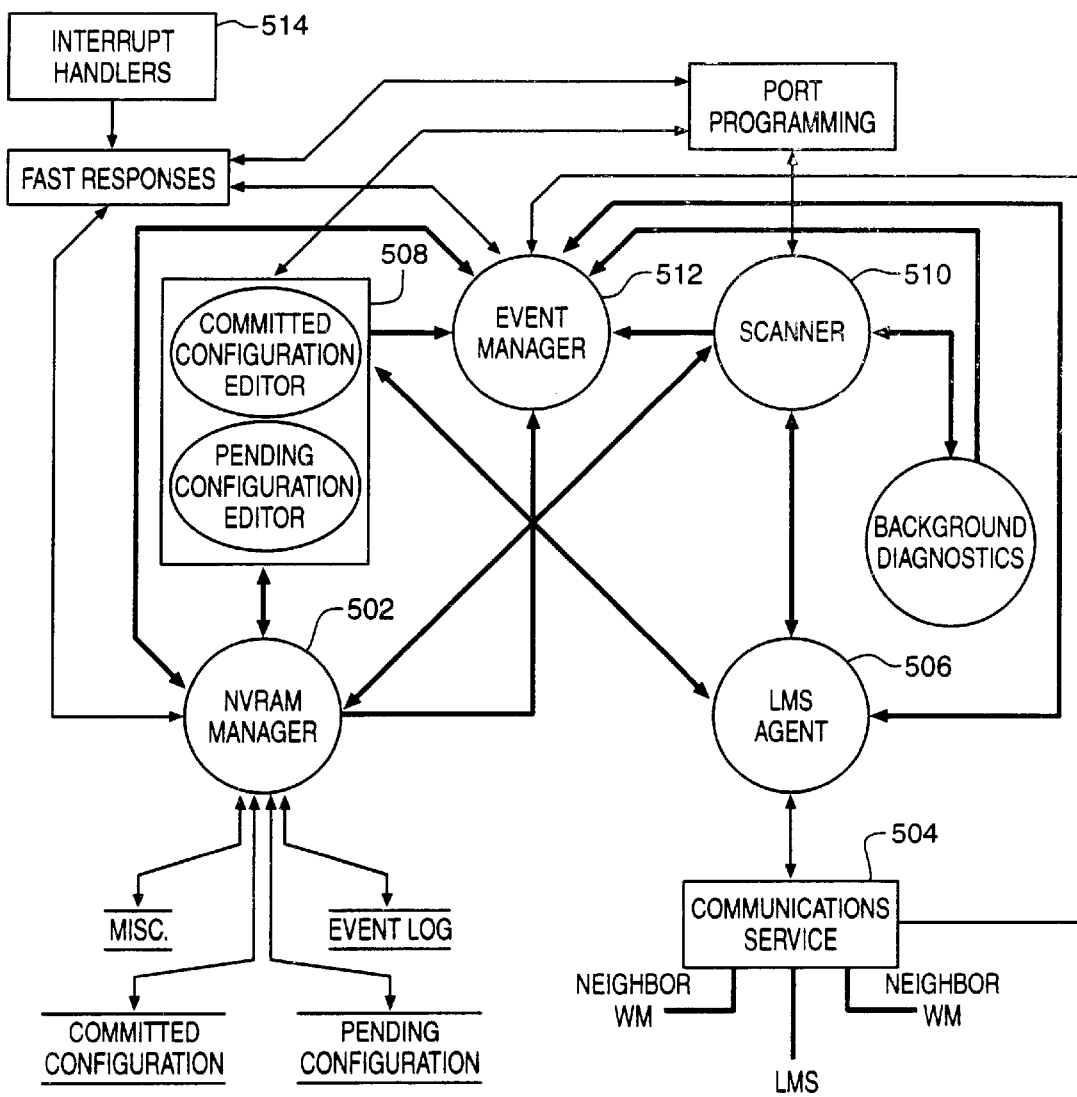
FIG. 17 shows the software components of the wiring manager.

With the aid of FIG. 17, a description of the software components of the wiring manager will now be presented.

The WM software includes a service-level component intended to act as a simple intermediary between the rest of the WM software and the VRTX operating system. VRTX supplies a relatively low level memory management facility. Rather than have each WM software component access this lower level interface directly, a NVRAM manager 502 is used. In addition to a simplified interface, NVRAM Manager 502 ensures that the memory is uncorrupted by maintaining checksums of critical NVRAM regions.

Wiring manager 14 includes communications service software 504 that supports one RS-232 and two RS-422 asynchronous serial ports dedicated to the serial control channel. The RS-422 ports connect to neighboring wiring managers to form a serial loop. The RS-232 port supports connection to the controlling LMS.

To wiring manager software components, an LMS agent 506 represents the controlling LMS. A single copy of the LMS Agent resides upon wiring manager 14. LMS agent 506, in its role as LMS representative, performs two basic functions. First, it routes messages between the LMS (via Communication Service 504) and wiring manager clients. Second, it translates LMS messages into WM instructions before routing them to the appropriate WM software component. On one side, the LMS Agent presents a standard message interface to the VRTX32-386 message system, and thus to other software components in the WM. On the other side, LMS agent 506 connects to the LMS through communications service 504. This agent ensures that other WM software components, such as configuration manager 508 (described later), can always communicate with what appears to them as the LMS. Each component requiring contact with a LMS need not deal with external message format related issues since such matters are left to LMS agent 506 and communications service 504.

All LMS communications with a wiring manager are via WM agent (not shown) on LMS 12 which represents that wiring manager. All WM communications with its LMS 12 are made via LMS agent 506 on wiring manager 14. To bridge the gap between LMS 12 and wiring manager 14, the WM Agent and LMS agent 506 communicate with each other.

The LMS controls wiring manager 14 through an instruction set. Each instruction consists of a single byte followed by zero, one or more data items. A list of the instructions and each of the instructions in that list and its parameters is described briefly below.

As messages are received by communications service 504, they are forwarded to LMS agent 506. LMS agent 506 takes apart the message into its component instructions. All instructions are discarded if the WM ID in the message is zero. If the WM ID is nonzero, messages are forwarded to the appropriate manager or handler for processing. The various time outs which appear in the commands are used to ensure than an editing session which LMS 12 never completes will not remain pending forever. Wiring manager 14 eventually returns to a state where it is ready to start a new editing session.

The BEGIN_EDIT instruction begins a configuration editing session. Wiring manager memory contains two configurations: the COMMITTED configuration, which is in control of wiring manager 14, and the UNDEFINED configuration, which provides a place to do configuration edit operations. When the BEGIN_EDIT instruction is executed with its Clear Flag set to zero, the UNDEFINED configuration is filled with a copy of the COMMITTED configuration. When this command is executed with the Clear Flag set to one, the UNDEFINED configuration is set to a clear, or NULL, configuration.

The Configuration Number and Configuration Name are copied into the PENDING configuration. If no errors are encountered, an ACK message is generated. If any errors occur, the instruction is discarded and a NAK message is generated.

The Timeout Period specifies the maximum number of seconds that will be permitted between PUT_OBJECT (see next paragraph) instructions directed to the PENDING configuration. It also specifies the maximum number of seconds permitted between the last PUT_OBJECT and the END_EDIT instruction. If this time limit specified by Timeout Period is exceeded, the edit session is abandoned, an NAK response message is sent, and an EDIT_ABANDONED event is generated. Note that both a message and an event are sent because of uncertainty as to why the LMS exceeded the time limit.

The PUT_OBJECT instruction is used to insert data into a selected field of the selected object. The format and length of the data is determined by the type of the field. When this command executes successfully, an ACK is returned only if one was requested in the instruction (see 'a' bit in opcode). When this command encounters an error in execution, an NAK response is sent. In addition, if the configuration being edited is the PENDING one, the edit session is abandoned (see ABANDON_EDIT instruction).

The GET_OBJECT instruction obtains the contents of the selected field of the selected object and includes it in a variant of the EDIT_ACK response message.

The GET_OBJECT_SIZE instruction obtains the type and size, maximum and current, of the specified field of the specified object and includes the information in a variant of the ACK response message.

The END_EDIT instruction ends the editing session. The number of PUT_OBJECT instructions noted in this instruction is compared with those actually received by wiring manager 14. If this number matches, the PENDING configuration is locked awaiting either an ACTIVATE_PENDING or an ABANDON_PENDING instruction and an EDIT_ACK response message is sent. If the number of PUT_OBJECT instruction noted in the instruction does not match those received by wiring manager, an NAK message is sent and the edit is abandoned.

The timeout period in the END_EDIT instruction is similar to the timeout period in the BEGIN_EDIT instruction. In this case the period being timed is that between this instruction and the (expected) ACTIVATE_PENDING instruction.

The ACTIVATE_PENDING instruction causes any Hold Off settings in the PENDING configuration to be copied to the COMMITTED configuration. (See later discussion of the "Hold Off" field in the table "Port Objects for Token Ring Ports" for an explanation of the function of hold off settings.) The PENDING configuration is then placed in control of wiring manager 14. If this operation is successful, an ACK response is sent.

The Timeout Period in this case is the period between this instruction and the (expected) COMMIT instruction. If this Timeout period occurs, the "Hold Off" flags remain in force, since they were copied to the COMMITTED configuration when this instruction was executed.

The COMMIT instruction is applied to the PENDING configuration. When applied to the PENDING configuration, the COMMITTED configuration becomes the UNDEFINED configuration and the PENDING configuration becomes the COMMITTED configuration and all Hold Off settings in the COMMITTED configuration are cleared. When the operation is completed an EDIT_ACK response is sent.

The ABANDON_PENDING instruction causes the PENDING configuration to become the UNDEFINED configuration. If the PENDING configuration had been in control, the COMMITTED configuration is enforced in the hardware. At completion of the operation an ACK response is sent. If the ACTIVATE_PENDING instruction had been issued prior to this instruction, any "Hold off" flags in the PENDING configuration will have been copied to the COMMITTED configuration. In this case, using ABANDON_PENDING does not clear these flags and it is necessary to follow this command with a COMMIT command to clear the "Hold Off" flags.

The SCAN instruction modifies the standard operation of a background task in wiring manager 14 referred to as scanner 510 (see FIG. 17). This background task runs periodically at a very low priority in the system. The primary purpose of scanner 510 is detection of events which are not otherwise detected by the hardware interrupt mechanism. These events include the installation and removal of cards and testing the status of system components such as power supplies and fans. These tests are performed every time the scanner executes. In addition, scanner 510 tests various other components one piece at a time each time it is run. These include ROM, RAM and NVRAM tests, which test one word each time scanner 510 runs, and programming verification, which tests one register each time scanner 510 runs.

Execution of the SCAN instruction causes two changes to the standard scanner operation. First, the scanner priority is set as high as possible consistent with maintaining other system responsibilities at an acceptable level. Second, the tests which are normally done a bit at a time are done all at once, from the beginning. Once all these tests have completed, scanner 510 returns to its normal priority levels and the bit-at-a-time tests return to their usual operation. An acknowledge message is transmitted to LMS at that time.

All system objects are updated as usual and events are generated in the usual way (described later). The SCAN instruction is used by the LMS to obtain an up-to-date picture of the system.

Many commands issued by the LMS to wiring manager 14 require a response of some kind. These are all considered to be Response Messages. Response Messages may be either positive or negative in nature. The positive, or ACK (for acknowledge), response indicates that the command was carried out as desired. The ACK response typically contains whatever additional data is required to fully respond to the command. The negative, or NAK (for negative acknowledge), response indicates that the command could not be carried out. The NAK response also contains whatever additional data is needed to specify why the command could not be completed.

A list of response messages are presented in Appendix IV. A response message uses a standard format. In all cases, an ACK or NAK message begins with an ACK (00000110) or a NAK (00010101) byte. This is always followed by the opcode of the instruction being ACK'd or NAK'd. The remainder of the message, if any, depends on the instruction being responded to.

The general form ACK response message is used for instructions, such as BEGIN_EDIT, which do not need to return a data value along with the ACK. The configuration number is included because the vast majority of general form ACKs are used as part of an edit operation. In cases where the ACK is not configuration dependent, the number of the COMMITTED configuration is used.

The GET_OBJECT form ACK response message is used in response to a GET_OBJECT instruction. The GET_

OBJECT_SIZE form ACK response message is used in response to a GET_OBJECT_SIZE instruction.

The general form NAK response message, or negative acknowledge, is used whenever an instruction fails. The instruction which caused the error, and an error code are included in the response.

The edit form NAK is used whenever an editing instruction fails. In each case the configuration, object, and field being accessed is specified along with the actual instruction which caused the error. Also, an error code is included.

Wiring manager 14 notifies LMS 12 of the occurrence of certain events through the various event messages listed in Appendix V. All event messages begin with an EVENT flag byte (01000101), a time stamp, and an event number. The event number is incremented for each event generated by wiring manager 14. This number initializes to zero when a new wiring manager is first powered up.

The CARD_INSTALLED, CARD_REMOVED, and CARD_INCORRECT messages are self-explanatory. The PORT_INCORRECT message is generated whenever the port type is not the type which was specified in the DEFINED configuration for the port position where the port was installed. The PORT_ERROR message indicates that the port failed either during verification or testing. This failure message implies that other ports on the card may still be working correctly. The CARD_ERROR message indicates that the card failed either during verification or testing and for the reasons specified in the "Feature Being Monitored" table, also in Appendix V. This failure message implies that all ports on the card have failed.

The SIGNAL_ON and SIGNAL_OFF event messages are issued by devices connected to ports on cards installed in wiring manager 14. The SIGNAL_ON event message indicates that the device is ready to become part of the network. The SIGNAL_OFF event message indicates that the device has ceased to be part of the network. For a Token Ring station card these signals are derived from the Phantom DC signal of the Token Ring station. For a Token Ring Ring-In/Ring-Out card these signals are the wire fault ON and wire fault OFF signals of the other wiring manager.

The bootstrap event message is generated by event manager 512 (see FIG. 17) each time it initializes (which only occurs after a reset). Wiring manager 14 may be reset in several ways:

wiring manager power on;
controller module powered on;
controller module reset;
controller module catastrophic reset;
watchdog timer reset;
LMS induced watchdog timer reset;
LMS induced watchdog timer and catastrophic reset;
fatal software error; or
fatal hardware error.

There are two variants available to each of the reset causes: the "clean" reset and the "catastrophic reset." The "clean" reset means that the NVRAM contents are properly closed and their checksums all check. The "catastrophic" reset means that NVRAM contents are corrupted and must be rebuilt. There are three possible causes for a catastrophic reset. (1) A command from the LMS. (See "System Control Fields for System Objects" in the description of the wiring manager Object Identifiers and Field Selectors found elsewhere in this application. (2) An operator pressed both the RESET and LED TEST buttons on the controller card at the same time. (3) The NVRAM may actually be corrupted, in which case a catastrophic reset is also performed.

Referring again to FIG. 17, an interrupt handler 514 responds to an edge interrupt that is triggered by a summary interrupt signal from the port cards. The summary interrupt signal is generated as a logical OR of the individual interrupt sources from all the port cards. Depending on the card type, the interrupt may come from one of five sources on those cards:

1. Phantom DC ON/OFF, from a station or a wire Ring-In port.
2. Wire Fault ON/OFF, from a wire Ring-Out port.
3. DC Light ON/OFF, from a fiber optic Ring-In or Ring-Out port.
4. 4 Mbit Energy Detect On/Off from a fiber optic Ring-In or Ring-Out port.
5. 16 Mbit Energy Detect On/Off from a fiber optic Ring-In or Ring-out port.

The LMS enables or disables processing for each of these interrupt sources on a port by port or card by card basis through the use of the ENABLE flags for the port or card. In addition, the interrupt handlers for each of these are selected through the LMS setting of the "Insert Fast Response Routine #" and "De-insert Fast Response Routine #" fields of each port object.

Referring to FIG. 17, there is a configuration manager 508 that is responsible for maintaining the configuration data. The configuration data is the data which defines the user's network and how the wiring manager responds to events. The configuration is downloaded to the wiring manager from the LMS, via LMS agent 506 in the wiring manager.

The wiring manager has reserved space in its nonvolatile memory (NVRAM) for two configurations (approximately 10 kilobytes each), which are identified as the COMMITTED configuration and the PENDING configuration. Only the COMMITTED configuration controls the wiring manager. The PENDING configuration is used only during an edit session, at which time the LMS is building a configuration in the wiring manager. The COMMITTED configuration is saved across power-down and reset and is automatically activated after the wiring manager is reset. The integrity of this configuration is assured by NVRAM Manager 502, through which all NVRAM updates are routed. NVRAM Manager 502 maintains a checksum over the LMS controlled elements of the configuration. This checksum is tested to determine if a valid COMMITTED configuration exists after a power up.

If there is no saved COMMITTED configuration in the wiring manager at reset, a default null (no connections) or test (each port is on its own network) COMMITTED configuration is created and activated, depending on certain settings on the processor card.

A configuration consists of a set of objects, where each object is a data structure with a defined format. Each object consists of a number of fields and is used to represent a physical or logical part of the wiring manager. Fields in the configuration are "owned" by either the Wiring Manager or the LMS. Ownership means that the owner may write data into that field.

The parts of the configuration owned by the LMS define how the LMS expects the wiring manager to be configured. Some of these are requirements, such as card and port types in particular positions. Others are indications of how the wiring manager should configure itself if possible, such as network positioning of ports which are alive. Configurations are modified by instructions sent from the LMS. These instructions allow the LMS to define networks, create a PENDING configuration, switch control to the PENDING configuration and so forth.

In addition to the predefined states of COMMITTED and PENDING, the LMS may assign a configuration number and a configuration name to each configuration. These are primarily intended to ensure consistency in the instructions used to modify a configuration by requiring the configuration number in each instruction which modifies a configuration.

There are two major phases to installing a configuration in a wiring manager. First, the LMS sends edit instructions to the wiring manager to cause the wiring manager configuration to match the LMS intentions. Second, the hardware and the software of the wiring manager is programmed with the configuration. This second part is handled by the wiring manager as a result of the configuration changes.

There are three steps to loading a configuration. First, the PENDING configuration is created by a BEGIN_EDIT instruction. In response to receiving that instruction, the wiring manager prepares to edit the PENDING configuration by either copying the COMMITTED configuration or creating a null (no connections) configuration, depending on a parameter to the BEGIN_EDIT command. The wiring manager returns an ACK or NAK response. Second, the LMS modifies objects in the PENDING configuration using the PUT_OBJECT instruction. If the object is successfully changed and the LMS wanted the PUT_OBJECT command ACKed, the wiring manager returns an ACK response. If there is an error changing the object in the wiring manager, the wiring manager abandons the edit session and return the appropriate NAK response. The LMS may stop editing the PENDING configuration by issuing an ABANDON_PENDING instruction, which causes the edit to be stopped and the PENDING CONFIGURATION to be undefined. An ABANDON_PENDING instruction is always ACKed. Third, after the objects have been modified as desired by the LMS, the LMS completes the configuration by issuing the END_EDIT instruction. The wiring manager responds with an ACK response.

To make the PENDING CONFIGURATION control the wiring manager, the LMS issues the ACTIVATE_PENDING instruction. The wiring manager programs and activates any ports not selected to be "held off". Normally this will be all the station ports. Any ports selected as "held off" are programmed to disconnect only. Normally this will be any RingIn/RingOut ports which were modified. This postponed activation is done to ensure customer network security. The "Hold Off" flags are copied from the PENDING configuration into the COMMITTED configuration at this time. This ensures that in any case where the wiring manager reverts to the COMMITTED configuration, the held off ports remain held off.

If no errors occur, the wiring manager returns an ACK response. If the wiring manager detects any error while activating the PENDING configuration, it reverts to the COMMITTED configuration and returns a NAK response indicating the error detected.

Once the PENDING configuration has been activated with the ACTIVATE_PENDING instruction, the LMS may issue the COMMIT instruction. This makes the PENDING configuration the COMMITTED configuration and makes the previously COMMITTED configuration undefined. The "Hold Off" flags for all ports are also cleared, thus allowing the RingIn/Ringout ports to activate.

As already noted, configuration management and control of wiring manager 14 is done through the objects, which are those items that the LMS may manipulate to influence the behavior of wiring manager 14. Objects are used to represent each physical entity, such as a card or port within wiring manager 14. The LMS addresses the objects within wiring manager 14 by using an object identifier. Each object is divided into a number of fields. The field is selected using a field selector.

An Object Identifier consists of two parts, each one byte in size. The first, the GROUP ID, selects the group the object resides in. The second, the ITEM ID, selects the specific object. Field Selectors are one byte in size and select a field within an object. Field selectors are assigned on basis of the object type (or class). That is, two objects may both have a field selector of three, but field three can mean different things to different types of objects. Each field is "typed", in that it may contain only certain kinds of information. Each field also has an "owner". The owner is either the LMS or the wiring manager. The owner of a field is the system which may write to that field. The other system treats that field as read only. In the case of the LMS accessing the wiring manager, this assumption is enforced by the WM software.

The groups which exist within wiring manager 14. There are Card Slot Objects, Configuration Objects, and System Objects. As explained earlier, the wiring manager may have two configurations in memory at one time, the COMMITTED configuration and the PENDING configuration. With the exception of the System Objects group, all of the groups shown above have both COMMITTED and PENDING counterparts. The instructions used to access the objects in these groups select which is being operated upon.

The System Objects group exists only within the COMMITTED configuration. More correctly, the System Objects group may be said to transcend configurations, but since the instruction set requires a configuration selection they are placed in the COMMITTED configuration, since this configuration always exists.

The structure of a card slot objects group which includes port objects and card objects. Port objects control the behavior of eack port within a given slot. Card objects control the behavior of the card installed in the slot the group represents.

The structure of the configuration objects group. Configuration objects include either configuration information which provides information about the configuration or system control information which controls how the overall wiring manager behaves while this configuration is in control.

The structure of the System Objects group. As was mentioned before, the System Objects group exists only in the COMMITTED configuration.

B. Event Management

Referring to FIG. 17, event manager 512 in wiring manager 14 detects the occurrence of certain events and determines how wiring manager responds to these events once they are detected. An event is defined as a state change to an object, while a response is the action which is taken as the consequence of an event.

In general, events may be divided into two categories: complex events and simple events. Complex events involve relationships between two or more simple events and are defined only within the LMS. Simple events involve only single occurrences related to a single objects and these are what are handled by the event manager.

A simple event is defined as one change in state of one object, the state of which the wiring manager is capable of monitoring. The set of simple events which are detected is predetermined by the WM software. These events were described in preceding paragraphs relating to "Event Messages".

A response is the action taken by the WM as the result of an event. The combination of an event and its associated response is defined as an incident. There are 2 types of responses: fast and fixed. Fast responses handle the time-critical processing of an incident. Fixed responses handle the non-time-critical processing of an incident. All events have a fixed response, but only events which are detected by interrupts have fast responses. A fixed response has 2 parts: processing and notification. Every fixed response has these 2 parts, but the processing part may be a null function. The LMS has the ability to selectively enable and disable all 3 parts of a response: the fast response, the fixed processing, and the fixed notification.

Simple events are detected by 3 methods: (1) hardware (HW) interrupts, (2) microprocessor ($\mu$P) interrupts, and (3) software (SW) polling. Note that some events may be detected by more than one method. HW interrupts are generated by the WM hardware external to the 80386SX $\mu$P, $\mu$P interrupts are generated by the 80386SX $\mu$P when it detects certain conditions. SW polling events are generated by a SW entity checking for an event, either once or repetitiously.

The hardware interrupt events are restricted to those requiring rapid handling by the wiring manager, such as a station disconnecting from a network. These interrupts trigger a fast response as defined in the configuration by the LMS. Also included in this group, are microprocessor interrupts, such as divide by zero or memory parity errors.

Scanner process events are similar to hardware interrupt events. They trigger some form of handling defined by the LMS in the configuration. In some cases, such as testing a newly installed card, the response occurs without configuration control being necessary.

When an event is detected by the wiring manager, by any method, it is stored in an event log, which is implemented as a circular queue. Each event in the event log has a time stamp, accurate to 0.1 seconds. Events are always logged, even if no response is executed. Logging an event is not considered part of the fixed response because a fixed response may be disabled; event logging cannot be disabled.

A fast response is executed in response to a simple event and handles the time-critical processing for an incident. Fast responses are available only to events which are detected by HW interrupts. The interrupt handler executes the fast response if the fast response is enabled.

For an event which has a fast response, the wiring manager provides a small number of different fast responses. The LMS specifies the fast response to be executed, not the fast response itself. The fast response are part of the WM software; the fast response to be executed is part of the configuration the LMS downloads to the WM.

The fixed response is executed in response to a simple event. It handles the non-time-critical processing and is part of the WM software. When an event occurs, the wiring manager checks if the fixed processing response is enabled. If it is, the fixed processing response is executed. Next, the wiring manager checks if the fixed notification is enabled. If it is, the appropriate Event Message is sent to the LMS.

C. Wiring Manager Port Processing

The following is a summary description of the operations performed by the wiring manager when the device attached to a port indicates that it should be inserted into or removed from a ring.

A station that is connected to a port on a station port module card indicates that it wants to be inserted into the ring by asserting DC (Phantom DC ON Station Insertion). When the controller module determines that the station has asserted its Phantom DC ON and if the COMMITTED configuration contains information for that particular port, the controller module sends the appropriate connection instructions to the station port module card. The connection procedure implemented by the controller module writing to the appropriate port card module registers is as follows. The ACT LED on the port module card that indicates whether a port is active is turned on flashing. The controller module sets the ports receive multiplexer source to its upstream neighbor and enables the ports MUX output so as to create a connection between the upstream neighbor and the new station. The controller module also turns on the appropriate (left or right) bus driver of that port to enable connection to its downstream neighbors multiplexer source. To complete the connection, the controller module sets the downstream neighbor's receive multiplexer source to this port. When all of these procedures are completed, the controller module turns the ACT LED on solid.

When the station wants to be removed from the ring it deasserts DC (Phantom DC OFF Station De-Insertion). When this is detected at the controller module and the source of the Phantom DC OFF signal is identified, the controller module implements the following disconnection procedure. The controller module turns on the appropriate (left or right) bus driver of the port's upstream neighbor to enable connection to this ports downstream neighbor's multiplexer source. The controller module sets the downstream neighbor's receive multiplexer source to this port's upstream neighbor. It turns off this port's bus drivers, disables the port's MUX output, and turns of the ACT LED.

In the case of the RI/RO cards, on which the wire fault signal is used to indicate availability/unavailability of a connection, a similar set of procedures is followed. For example, if wire fault is asserted (i.e., Wire Fault ON) this indicates that the RingIn/RingOut link is unavailable for connection to the wiring manager. When this happens the ring must be closed around the port. The controller module implements the following disconnection procedure. It turns on the appropriate (left or right) bus driver of the port's upstream neighbor to enable connection to the port's downstream neighbor's multiplexer source. It sets the downstream neighbor's receive multiplexer source to the port's upstream neighbor. It turns off the port's bus drivers, disables the port's MUX output, and turns off the ACT LED The port module enable/disable procedures will now be described. When the "Card Enable" field of the Card Object is set to TRUE, which happens when the controller module detects the presence of a port module card of the type anticipated by the configuration, it causes certain actions to take place. The card is reset. Tests are run on the card and on each port on the card. Background diagnostics are executed on the card. Interrupts are enabled. The ON-LINE LED on the card and the ENABLED LED on any port which is enabled are turned on. Note that this is not actually done by the code that enables the card but as a result of the scanner discovering the card has been enabled and updating the port enable LEDs.

When the "Card Enable" field of the Card Object is set to FALSE, it causes certain actions to take place. Background diagnostics will no longer be executed on the card. Interrupts are disabled. Any ports which are alive are mapped out of the networks they reside in. The card is reset (which turns off all LEDs except the power LED).

When a port card is removed while enabled, the departure is (eventually) detected by the scanner task. When this happens a procedure similar to that of a card disable occurs. Background diagnostics will not be attempted. Any ports which were alive are mapped out of the networks they reside in. An event is generated recording the departure.

Note that the port module reset operation mentioned in both the enable and disable cases is a feature built into the hardware of the card. It causes all components on the card to be fully cleared and all settings to be returned to their default states.

As further illustration of the operation of the system, a brief description of the procedure followed when a station that is connected to a port powers up is given. After the station powers up, it performs a loopback test according to a standard protocol. After the loopback test, the station asserts DC and looks for a Wire Fault signal from the port. If the station sees no Wire Fault, it continues with establishing the connection. In response to detecting the DC signal from the station, the port module card sets an appropriate bit in the Phantom DC POS edge interrupt register. This, in turn, results in a summary interrupt signal being sent to the controller module.

The asserted summary interrupt signal causes the generation of an edge interrupt thereby invoking an interrupt service routine that determines the source of the interrupt by checking the port module registers. When the port that generated the interrupt is identified, the source of the interrupt is cleared and the controller module reconfigures the network to include the new station. It does this by manipulating the hardware of that port as well as the hardware of both the upstream and down stream neighbors of that port. For each affected port, this means that the switch is set appropriately and the appropriate driver (i.e., either the left or the right driver) is turned on.

After the network has been reconfigured to include the new station, an event is generated to higher level software notifying it of the changes (e.g. identifying the station and the port that has been added). At the conclusion of the interrupt service routine, the controller module again looks at the summary interrupt signal line to make sure that no other interrupts are pending. If the summary interrupt signal is still asserted, the interrupt service routine is again invoked to identify the other sources of the interrupt signal and to take whatever steps are appropriate. As long as a port remains active, the relevant interrupt sources for that port remain enabled.

Other embodiments are within the claims.

What is claimed is:

1. A wiring hub for interconnecting a plurality of network components to form a local area network, each of said plurality of network components capable of sending and/or receiving digital communication signals, said wiring hub comprising:

a data signal bus including a plurality of signal lines;

a programmable switching mechanism connected to said data signal bus, said programmable switching mechanism including a plurality of ports each of which can be electrically coupled to a different one of the plurality of network components to pass digital communications signals to and receive digital communications signals fro m the network component to which it is coupled, said programmable switching mechanism interconnecting a selectable set of said plurality of ports together through said data signal bus and in any user selectable ordered sequence to form a ring network, the programmable switching mechanism also including a plurality of port module cards each of which includes a plurality of multiplexers equal in number to the number of ports on that card and each of which is associated with a different one of the ports on that card, each multiplexer on any given card being able to selectively electrically couple a signal from any one of said plurality of signal lines of said bus to the port with which that multiplexer is associated, each of said port module cards including a different subset of said plurality of ports wherein the switching capability of said programable switching mechanism is distributed among said plurality of port module cards, each of said port module cards also including a plurality of driver modules equal in number to the number of ports on that card and each of which is associated with a different one of the ports on that card, each driver module including a left driver and a right driver wherein said left drivers drive the left side of their assigned signal lines and said right drivers drive the right side of their assigned signal lines; and a backplane including said data signal bus and a plurality of connectors connecting to said data signal bus wherein each port module card is plugged into a different one of said plurality of connectors on said backplane.

2. A wiring hub for interconnecting a plurality of network components to form a local area network, each of said plurality of network components capable of sending and/or receiving digital communications signals, said wiring hub comprising:

a data signal bus including a plurality of signal lines; and a programmable switching mechanism connected to said data signal bus, said programmable switching mechanism including:

a full, non-blocking matrix switch having a plurality of input terminals equal in number to said plurality of signal lines and a plurality of output terminals equal in number to said plurality of ports wherein each of said input terminals receives a signal from a different one of said plurality of signal lines and each of said output terminals provides a signal to a different one of said plurality of ports and wherein said matrix switch can electrically couple the signal from any one of said input terminals to any one of said output terminals;

a plurality of ports each of which can be electrically coupled to a different one of the plurality of network components to pass digital communications signals to and receive digital communications signals from the network component to which it is coupled, said programmable switching mechanism interconnecting a selectable set of said plurality of ports together to form a ring network;

a set of configuration registers wherein said full, non-blocking matrix switch is configured by writing configuration information to said set of registers, said configuration information identifying which input terminals are to be electrically coupled to which output terminals; and a controller module that generates the configuration information to determine which input terminals are to be electrically coupled to which output terminals to control the operation of the full, non-blocking matrix switch by writing the configuration information to said set of configuration registers;

mean for reading state recording means which record the state of said plurality of ports as determinded by associated state determining means; and means responsive to the state recording means for automatically and without user intervention reconfiguring said matrix switch in response to detecting a change in state as indicated by said state recording means.

* * * * *